United States Patent
Kondo et al.

(10) Patent No.: US 7,488,078 B2
(45) Date of Patent: Feb. 10, 2009

(54) DISPLAY APPARATUS, IMAGE PROCESSING APPARATUS AND IMAGE PROCESSING METHOD, IMAGING APPARATUS, AND PROGRAM

(75) Inventors: Tetsujiro Kondo, Tokyo (JP); Yuji Okumura, Kanagawa (JP); Tsugihiko Haga, Tokyo (JP); Tetsuya Murakami, Tokyo (JP); Kenji Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/845,572

(22) Filed: Aug. 27, 2007

(65) Prior Publication Data

US 2008/0055568 A1 Mar. 6, 2008

Related U.S. Application Data

(62) Division of application No. 10/674,090, filed on Sep. 30, 2003.

(30) Foreign Application Priority Data

Oct. 4, 2002 (JP) ............................. 2002-291819

(51) Int. Cl.
*G03B 21/26* (2006.01)
*G03B 21/14* (2006.01)
*G03B 21/22* (2006.01)
*G03B 21/00* (2006.01)
*E04H 3/10* (2006.01)

(52) U.S. Cl. ..................... 353/94; 353/119; 353/122; 352/6; 348/744

(58) Field of Classification Search ............... 353/7–10, 353/74, 79, 94, 119, 122; 348/51, 52, 54, 348/734, 739, 744; 359/475, 477–479, 451, 359/453, 457; 52/7
See application file for complete search history.

(56) References Cited

U.S. PATENT DOCUMENTS

| | | | |
|---|---|---|---|
| 5,803,570 A | 9/1998 | Chen et al. | 353/122 |
| 6,253,494 B1 | 7/2001 | Shaffron | 52/7 |
| 6,644,816 B1 | 11/2003 | Perra et al. | 353/119 |
| 6,909,543 B2 | 6/2005 | Lantz | 359/451 |
| 7,097,307 B2 | 8/2006 | Lawrence | 353/28 |
| 7,229,176 B2 | 6/2007 | Onaga | 353/10 |
| 7,369,142 B2 * | 5/2008 | Kondo et al. | 345/633 |
| 2006/0250529 A1 | 11/2006 | Kondo et al. | 348/739 |
| 2008/0055568 A1 | 3/2008 | Kondo et al. | |

FOREIGN PATENT DOCUMENTS

| | | |
|---|---|---|
| JP | 3-082493 | 4/1991 |
| JP | 9-107514 | 4/1997 |
| JP | 10-011249 | 1/1998 |
| JP | 2000-188746 | 7/2000 |

\* cited by examiner

*Primary Examiner*—Melissa Jan Koval
(74) *Attorney, Agent, or Firm*—Oblon, Spivak, McClelland, Maier & Neustadt, P.C.

(57) ABSTRACT

A system and method displays a realistic image that allows a user to readily grasp his/her own positional relationship and also to experience a sense of presence. An outer dome screen is disposed so as to surround a user, and an immersion image such as the scenery of the surroundings of an object is displayed thereon. An inner dome screen is disposed inside the outer dome screen, and it displays a bird's-eye image of the object as perceived by the vision of the user when the object is viewed from a viewpoint of the user. In this case, the user is allowed to readily grasp his/her own positional relationship by the bird's-eye image and is allowed to experience a sense of presence by the immersion image.

8 Claims, 30 Drawing Sheets

DISPLAY APPARATUS, IMAGE PROCESSING APPARATUS AND IMAGE PROCESSING METHOD, IMAGING APPARATUS, AND PROGRAM

CROSS-REFERENCE TO RELATED APPLICATIONS

This application is a Divisional of U.S. application Ser. No. 10/674,090, filed Sep. 30, 2003, and is based upon and claims the benefit of priority from prior Japanese Patent Application No. 2002-291819, filed Oct. 4, 2002, the entire contents of both of which are incorporated herein by reference.

BACKGROUND OF THE INVENTION

1. Field of the Invention

The present invention relates to display apparatuses, image processing apparatuses as well as image processing methods, imaging apparatuses, and programs. Particularly, the present invention relates to a display apparatus, an image processing apparatus, an image processing method, an imaging apparatus, and a program that allow an image to be presented to a user with a greater sense of presence than conventional devices and methods.

2. Discussion of the Background

As an example of a conventional apparatus for presenting a user with an image with a sense of presence, a display apparatus including an immersion screen is known. In the display apparatus including the immersion screen, the user is presented with an image that would be perceived by the vision of the user assuming that the user were in a virtual space (hereinafter referred to as an immersion image where appropriate). Thus, by viewing the immersion image, the user is able to experience a sense of presence as if the user were actually present in the virtual space provided by the immersion image.

The present inventors recognized several deficiencies with regard to the above-described conventional systems and methods. For example, since the display apparatus including the immersion screen, described above, displays an image that would be perceived by the vision of the user assuming that the user were in a virtual space, it is sometimes difficult for the user to grasp a relative position of the user in the virtual space provided by the immersion image.

As another example, in an automotive racing game (i.e., a racing video game), a bird's-eye image of an automobile driven by a user is displayed as viewed from a certain viewpoint. In this case, the user is able to readily grasp the position of the automobile the user is driving, and thus drive the automobile in a more realistic manner.

However, in a case where a bird's-eye image is displayed, compared with a case where an immersion image is displayed, a sense of immersion and a sense of presence are diminished.

SUMMARY OF THE INVENTION

The present invention has been made in view of the above limitations with conventional apparatuses and methods. The present invention enables a user to readily grasp his/her own positional relationship and also allows an image with a sense of presence to be displayed.

A display apparatus according to the present invention includes a first display mechanism for displaying a first image, which is disposed so as to surround the user; and a second display mechanism for displaying a second image, which is disposed inside the first display mechanism.

An image processing apparatus according to the present invention includes an image selecting mechanism for selecting a viewpoint image of a predetermined object as viewed from a viewpoint of a user, from among images captured respectively from a plurality of positions, based on the viewpoint of the user; and a viewpoint-image converting mechanism for converting the viewpoint image into a light-emission image based on the viewpoint of the user and a shape of the display mechanism.

An image processing method according to the present invention includes an image selecting step of selecting a viewpoint image of a predetermined object as viewed from a viewpoint of a user, from among images captured respectively from a plurality of positions, based on the viewpoint of the user; and a viewpoint-image converting step of converting the viewpoint image into a light-emission image based on the viewpoint of the user and a shape of display mechanism.

A program according to the present invention includes an image selecting step of selecting a viewpoint image of a predetermined object as viewed from a viewpoint of a user, from among images captured respectively from a plurality of positions, based on the viewpoint of the user; and a viewpoint-image converting step of converting the viewpoint image into a light-emission image based on the viewpoint of the user and a shape of display mechanism.

An imaging apparatus according to the present invention includes an omnidirectional imaging mechanism for imaging an object's surroundings in all directions, and a plurality of object-imaging mechanisms for imaging the object from a plurality of directions.

According to the display apparatus of the present invention, the first display mechanism that is disposed so as to surround (or at least partially surround, such as in a hemispherical context) a user displays a first image, and the second display mechanism disposed inside (e.g., within the hemispherical space) the first display mechanism displays a second image.

According to the image processing apparatus, image processing method, and program of the present invention, a viewpoint image of a predetermined object as viewed from a viewpoint of a user is selected based on the viewpoint of the user, and the viewpoint image is converted into a light-emission image based on the viewpoint of the user and a shape of display mechanism.

According to the imaging apparatus of the present invention, surroundings in all directions around an object are imaged, and the object is imaged from a plurality of directions.

DETAILED DESCRIPTION OF THE INVENTION

Figure 1:
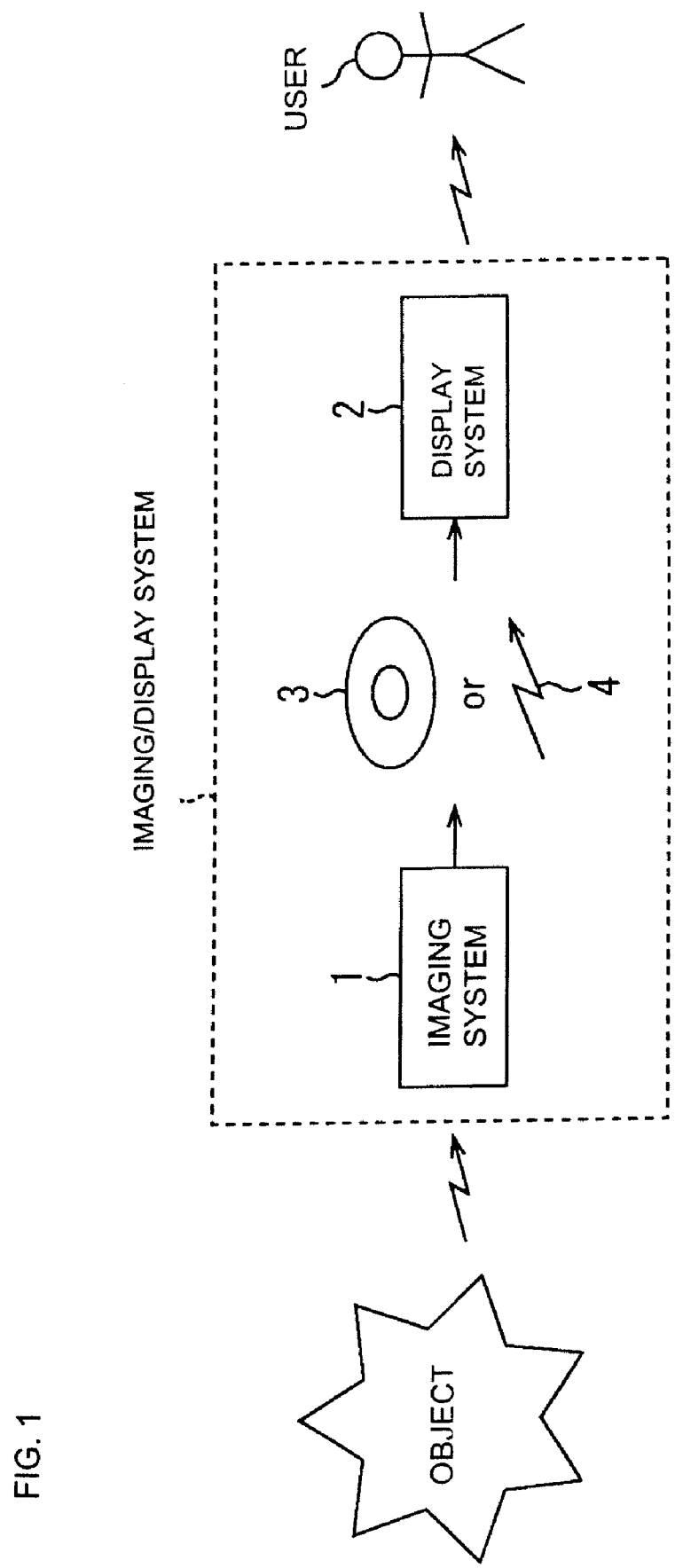
FIG. 1: Diagram showing an example configuration of an imaging/display system according to an embodiment of the present invention.

FIG. 1 shows an example configuration of an imaging/display system (a system refers to a logical combination of a plurality of apparatuses, regardless of whether the apparatuses are in the same enclosure) according to an embodiment of the present invention.

An imaging system 1 captures images of an object and images in all directions around (except, perhaps, beneath) the object. The imaging system 1 records the image data obtained on a recording medium 3, for example, an optical disk, a magnetic disk, a magnetic tape, or a semiconductor memory, or sends the image data via a transmission medium 4, for example, a telephone circuit, optical fiber, a satellite circuit, a microwave or other wireless link, a CATV (cable television) network, or the Internet.

A display system 2 plays back image data from the recording medium 3, or receives and displays image data transmitted via the transmission medium 4.

Figure 2:
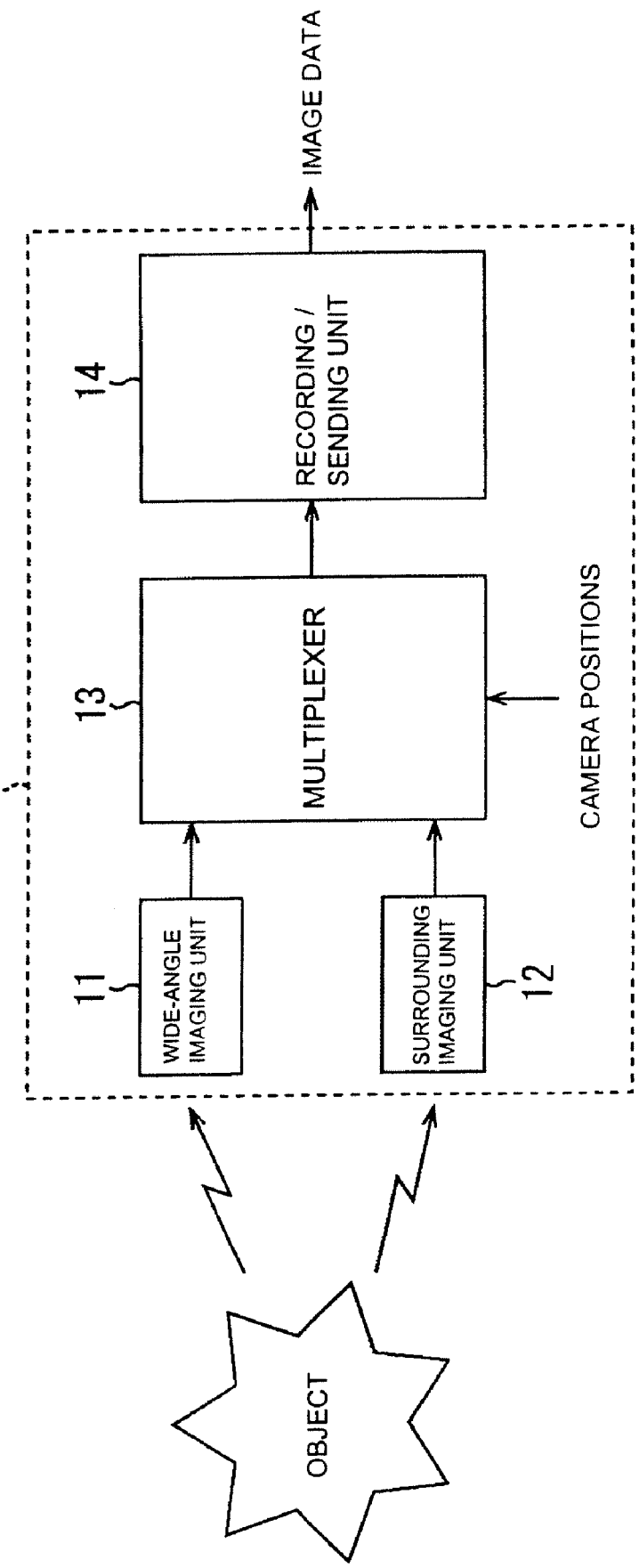
FIG. 2: Block diagram showing an example configuration of an imaging system.

FIG. 2 shows an example configuration of the imaging system 1 shown in FIG. 1. A wide-angle imaging unit 11 includes a wide-angle camera (video camera) for imaging the surroundings of the object over a wide angle, and it supplies wide-angle-image data (video data) captured by the wide-angle camera to a multiplexer 13. The wide-angle camera constituting the wide-angle imaging unit 11 is implemented, for example, by an omnidirectional camera for capturing images in all directions (or substantially all directions, such as all directions except directly beneath the object, or even all directions with a field of view, or still all directions with a substantially hemispherical volume around the object) around the object, as will be described later. Thus, the wide-angle image data output from the wide-angle imaging unit 11 includes images such as the scenery of the surroundings of the object.

A surrounding imaging unit 12 includes a large number of cameras (video cameras) disposed so as to surround the object in horizontal and vertical directions, and it supplies image data (video data) captured by the plurality of cameras to the multiplexer 13. In the surrounding imaging unit 12, the cameras disposed at a plurality of positions respectively output image data obtained by imaging the object from the positions of the cameras (camera positions). The image data of the object, captured from the plurality of positions, will be collectively referred to as surrounding-image data when appropriate.

The multiplexer 13 multiplexes the wide-angle-image data supplied from the wide-angle imaging unit 11 and the surrounding-image data supplied from the surrounding imaging unit 12, and supplies the resulting multiplexed image data to a recording/sending unit 14.

More specifically, the multiplexer 13 multiplexes wide-angle-image data and surrounding-image data of the same frame in association with each other. Also, the multiplexer 13 multiplexes each frame of surrounding-image data, i.e., image data captured from the plurality of camera positions, in association with the camera positions. It is to be assumed that the camera positions of the respective cameras constituting the surrounding imaging unit 12 are known in advance. The camera positions are represented, for example, by coordinates representing positions on a three-dimensional coordinate system having an origin at the position of the object.

The recording/sending unit 14 records the multiplexed image data supplied from the multiplexer 13 on the recording medium 3 (FIG. 1), or sends the multiplexed image data via the transmission medium 4.

Figure 3:
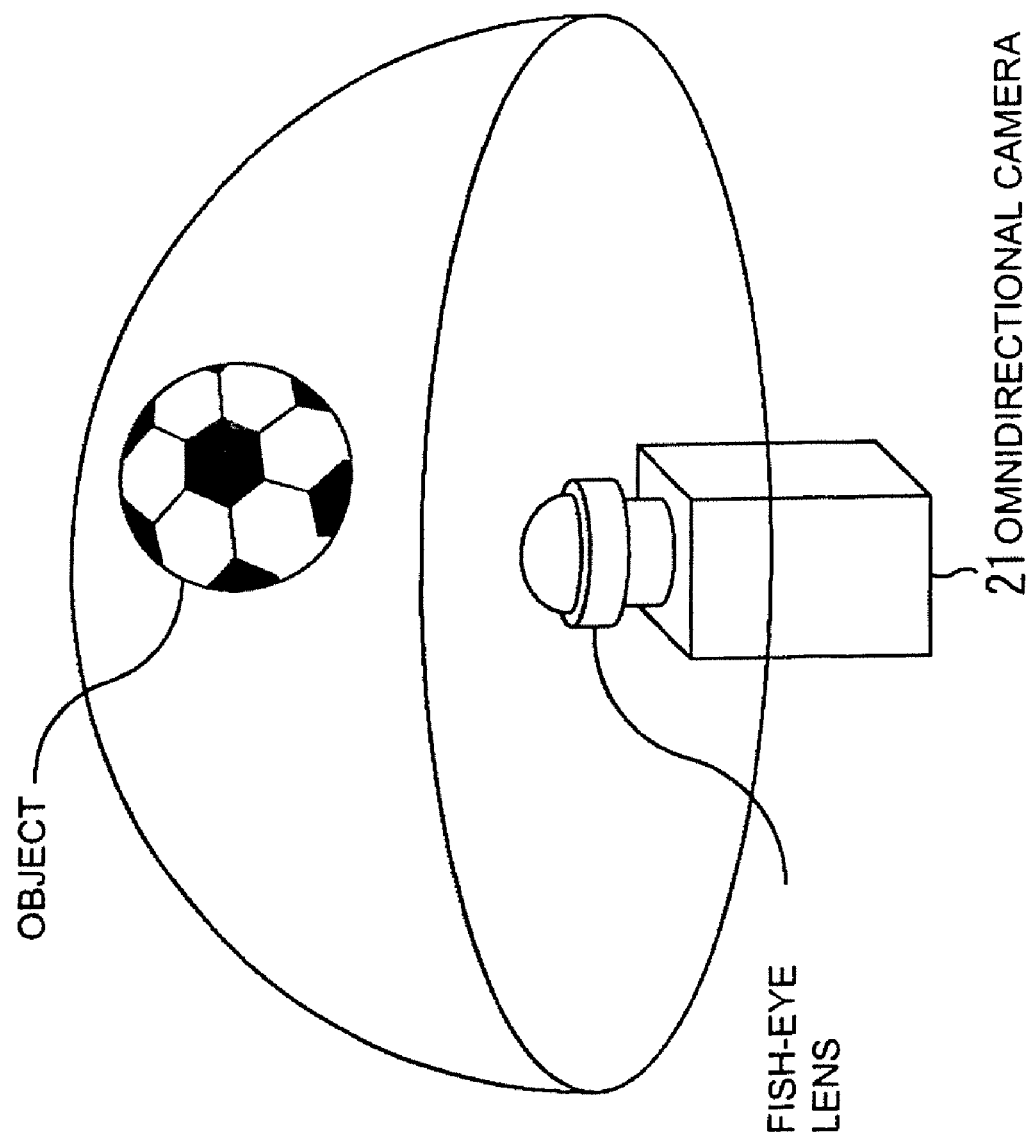
FIG. 3: Perspective view showing an example configuration of a wide-angle imaging unit.

FIG. 3 shows an example configuration of the wide-angle imaging unit 11 shown in FIG. 2. The wide-angle imaging unit 11 includes an omnidirectional camera 21. Ideally, the omnidirectional camera 21 receives light beams that are incident on the omnidirectional camera 21 through a hemispherical surface as shown in FIG. 3, and outputs image data corresponding to the light beams.

The omnidirectional camera 21 is implemented, for example, by a camera with a fish-eye lens, or a camera with a hyperboloid mirror. In this embodiment, the omnidirectional camera 21 is implemented by a camera with a fish-eye lens. The resultant image of the object is captured in substantially all directions with respect to an observation point, which in this case is the location of the omnidirectional camera.

The omnidirectional camera 21 is disposed so as to allow imaging of the scenery, etc. in all directions around the object. The use of the term "all directions" is used herein in a general sense and is not intended to be narrowly interpreted; for instance the direction immediately beneath the camera or in the shadow of the object may not be included. For example, if the object is a soccer match that is being played in a stadium, the omnidirectional camera 21 is disposed, for example, at a center of the stadium, so that the omnidirectional camera 21 captures images of the scenery of the stand where spectators are watching the soccer match, or even the sky, or inside of the stadium dome.

Figure 4:
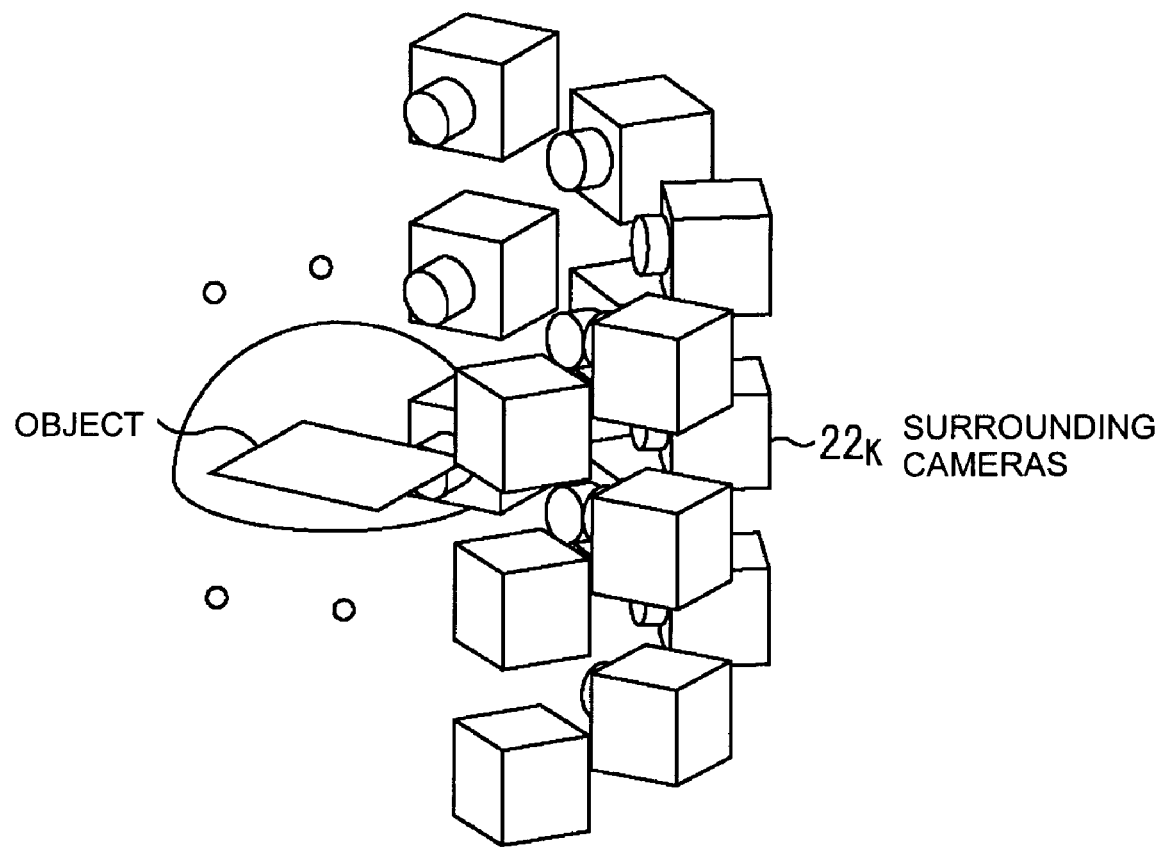
FIG. 4: Perspective view showing an example configuration of a surrounding imaging unit.

FIG. 4 shows an example configuration of the surrounding imaging unit 12 shown in FIG. 2. The surrounding imaging unit 12 includes a large number of surrounding cameras $22_k$ (k=1, 2, . . . ) that are disposed around the object so as to surround the object, so that the surrounding imaging unit 12 captures images of the object as viewed from a large number of viewpoints. Thus, for example, if the object is a soccer match that is being played in a stadium as described earlier, the large number of surrounding cameras $22_k$ constituting the surrounding imaging unit 12 are respectively disposed so as to surround (i.e., at least within the gamut of candidate venues for watching the soccer field) a soccer field provided in the stadium, so that the surrounding cameras $22_k$ captures images of what is going on in the soccer match on the soccer field.

The surrounding cameras $22_k$ may be disposed in a horizontal plane only in longitudinal directions (horizontal directions) of the object or in all longitudinal and latitudinal directions (horizontal and vertical directions) of the object. If the surrounding cameras $22_k$ are disposed only in the longitudinal directions of the object in a horizontal plane, only a horizontal parallax system, which will be described later, can be employed. If the surrounding cameras $22_k$ are disposed in all longitudinal and latitudinal directions of the object, either a horizontal parallax system or a vertical-and-horizontal parallax system, which will be described later, can be employed.

Figure 5:
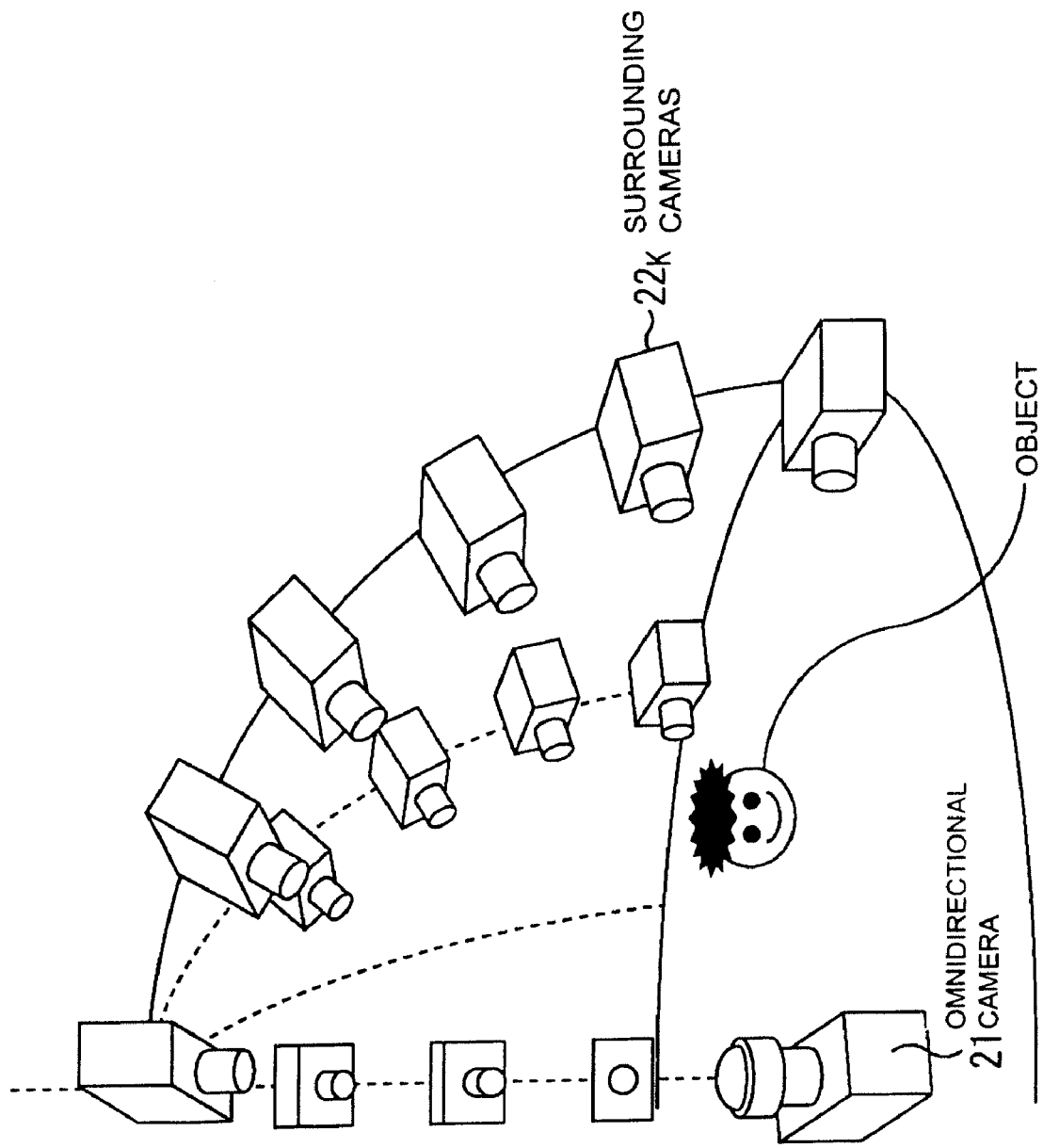
FIG. 5: Diagram illustrating a relationship of positions of an omnidirectional camera and surrounding cameras.

FIG. 5 shows the relationship of positions where the omnidirectional camera 21 (FIG. 3) and the surrounding cameras $22_k$ (FIG. 4) are disposed. The surrounding cameras $22_k$ are disposed, for example, on a spherical surface of a hemisphere surrounding the object, at regular longitudinal and latitudinal intervals. The surrounding cameras $22_k$ image the object with the positions of the surrounding cameras $22_k$ (camera positions) as viewpoints.

The omnidirectional camera 21 is disposed, for example, at a center of the hemisphere where the surrounding cameras $22_k$ are disposed. The omnidirectional camera 21 images the surroundings of the object in all directions, i.e., in directions of points located on the curved surface of the hemisphere where the surrounding cameras $22_k$ are disposed from the center of the hemisphere. Moreover, the term "in all directions" refers to directions that correspond to points on a surface from which there are candidate vistas of at least a portion of a space in which an object is located. This surface may also include the planar surface portion of the hemispherical shape, but need not (although may) include directions that are outside the field of view of the omnidirectional camera 21.

In the embodiment shown in FIG. 5, the omnidirectional camera 21 is positioned so that an optical axis thereof extends in the direction of a north pole of the hemisphere where the surrounding cameras $22_k$ are disposed (in the direction of a point with latitude of 90 degrees). The surrounding cameras $22_k$ are disposed so that optical axes thereof extend in the direction of the center of the hemisphere.

It is to be understood that the omnidirectional camera 21 and the surrounding cameras $22_k$ may be disposed at positions other than the positions shown in FIG. 5, or even in spaces other than in a hemispherical space, such as a cube, or other traditional or non-traditionally defined 3 dimensional interior space (e.g., it may be an arbitrarily shaped space).

In the imaging system 1 shown in FIG. 2, in the wide-angle imaging unit 11, the omnidirectional camera 21 (FIG. 3) captures images in all directions around the object, and supplies obtained omnidirectional-image data (wide-angle-image data) to the multiplexer 13. At the same time, in the surrounding imaging unit 12, the surrounding cameras $22_k$ (FIG. 4) capture images of the object as viewed from the camera positions thereof, and supplies surrounding-image data obtained to the multiplexer 13.

The multiplexer 13 multiplexes the omnidirectional-image data supplied from the wide-angle imaging unit 11 and the surrounding-image data supplied from the surrounding imaging unit 12, and supplies the resulting multiplexed image data to the recording/sending unit 14.

The recording/sending unit 14 records the multiplexed image data supplied from the multiplexer 13 on the recording medium 3 (FIG. 1), or sends the multiplexed image data to a destination (such as a computer at a remote location) via the transmission medium 4.

Thus, in the imaging system 1, for example, if the object is a soccer match that is being played in a stadium, the scenery of the stands where spectators are watching the soccer match, and a soccer ball kicked up high, etc. are imaged to obtain omnidirectional-image data, and images of the ground and players in the soccer match as viewed from a large number of viewpoints are captured to obtain surrounding-image data.

Figure 6:
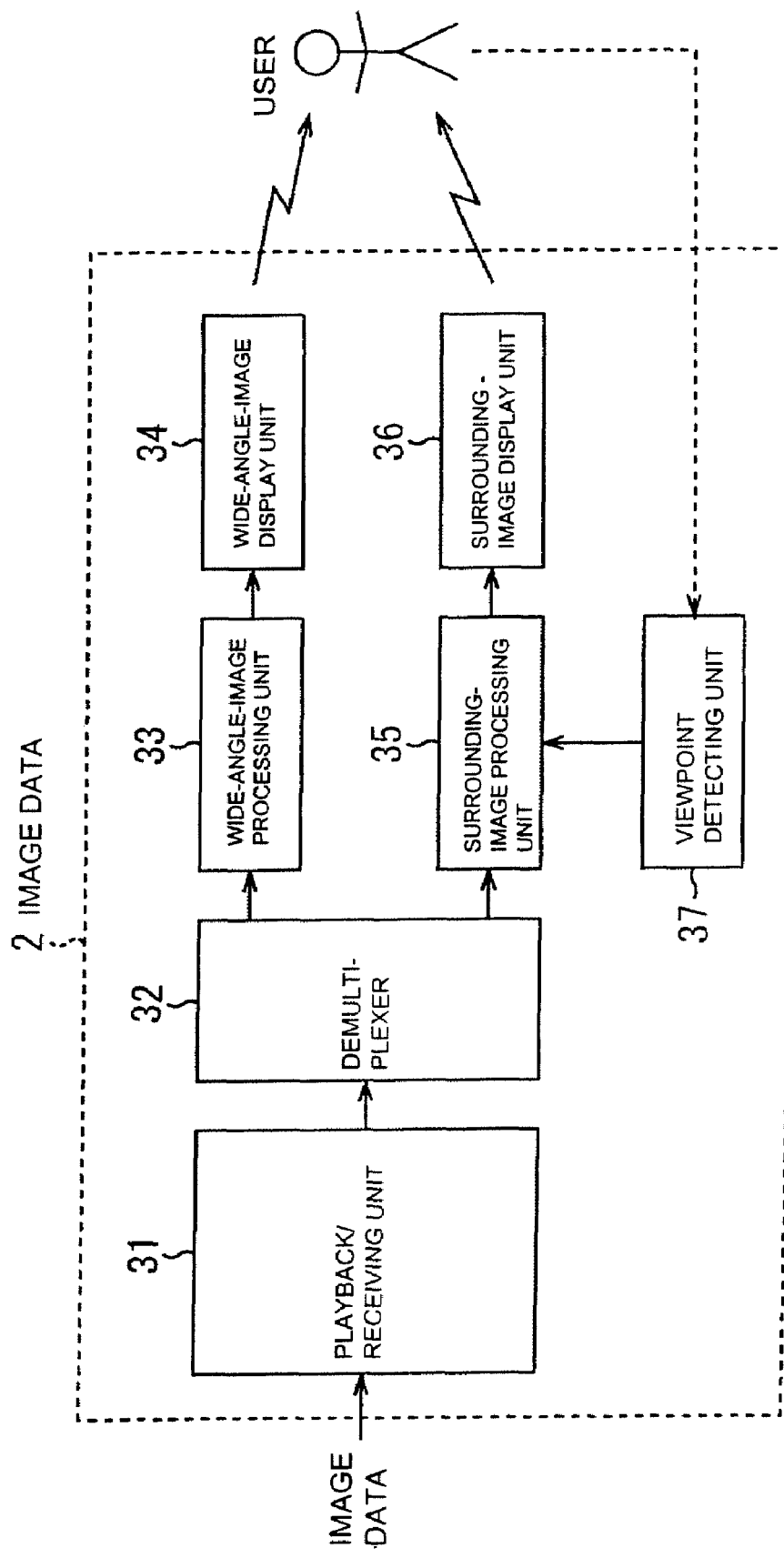
FIG. 6: Block diagram showing an example configuration of a display system.

Next, FIG. 6 shows an example configuration of the display system 2 shown in FIG. 1. A playback/receiving unit 31 plays back multiplexed image data from the recording medium 3 (FIG. 1), or receives multiplexed image data transmitted via the transmission medium 4 (FIG. 1), and supplies the multiplexed image data to a demultiplexer 32.

The demultiplexer 32 demultiplexes the multiplexed image data supplied from the playback/receiving unit 31 into frame-by-frame omnidirectional-image data and surrounding-image data, and supplies the omnidirectional-image data to a wide-angle-image processing unit 33 while supplying the surrounding-image data to a surrounding-image processing unit 35.

The wide-angle-image processing unit 33 processes the omnidirectional-image data supplied from the demultiplexer 32, and supplies the resulting image data to a wide-angle-image display unit 34.

The wide-angle-image display unit 34, based on an image corresponding to the image data supplied from the wide-angle-image processing unit 33, displays an immersion image that presents a user with a sense of immersion.

The surrounding-image processing unit 35 processes the surrounding-image data supplied from the demultiplexer 32 in accordance with a user's viewpoint supplied from a viewpoint detecting unit 37, thereby generating image data of the object as viewed from the user's viewpoint, and supplies the image data to a surrounding-image display unit 36.

The surrounding-image display unit 36, based on the image data supplied from the surrounding-image processing unit 35, displays a bird's-eye image of the object as viewed from a particular viewpoint such as the user's viewpoint.

The viewpoint detecting unit 37 detects a viewpoint of a user, and supplies the user's viewpoint to the surrounding-image processing unit 35. The viewpoint detecting unit 37 is implemented, for example, by a magnetic sensor from Polhemus, Inc., which functions as a three-dimensional position sensor. In that case, the viewpoint detecting unit 37 implemented by the magnetic sensor is mounted, for example, on the head of the user. Alternatively, the viewpoint detecting unit 37 may be implemented by a mechanism that allow user-controlled input regarding (change of) a viewpoint, such as a joystick or a track ball. That is, the viewpoint detecting unit 37 need not allow detection of an actual viewpoint of a user, and may be a mechanism that allows input of a virtual viewpoint of a user.

Figure 7:
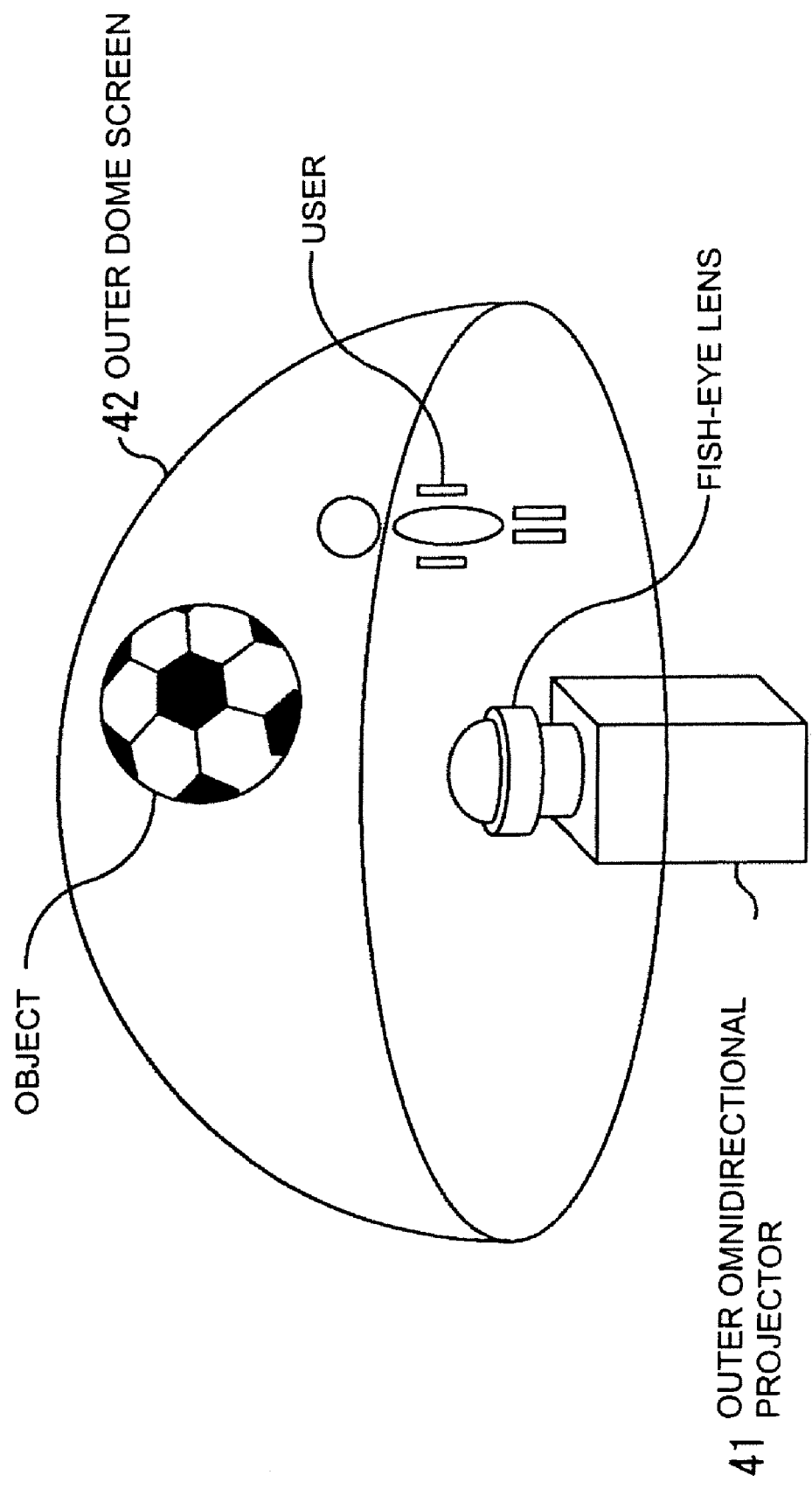
FIG. 7: Perspective view showing an example configuration of a wide-angle-image display unit.

FIG. 7 shows an example configuration of the wide-angle-image display unit 34 shown in FIG. 6. The wide-angle-image display unit 34 includes an outer omnidirectional projector 41 and an outer dome screen 42. The outer omnidirectional projector 41 is capable of emitting light beams over a wide angle, and is implemented, for example, by an ordinary projector and a fish-eye lens serving as an optical system that spreads light beams emitted by the projector over a wide angle.

The outer dome screen 42 has a shape of, for example, a hemispherical dome, and is disposed so as to surround the user. Furthermore, the hemispherical dome serving as the outer dome screen 42 is large enough to allow a plurality of users to be accommodated therein and to move around to a certain extent, and the diameter thereof is, for example, on the order of 5 m.

On an inner (or outer) surface of the outer dome screen 42, for example, a coating material that causes light to be scattered is applied. Inside the outer dome screen 42, the outer omnidirectional projector 41 is disposed so that light beams will be emitted towards the inner surface of the outer dome screen 42, which in this hemispherical space constitutes "all directions".

More specifically, for example, the outer omnidirectional projector 41 is disposed so that an optical center thereof coincides with a center of the hemispherical dome serving as the outer dome screen 42 and so that an optical axis thereof is perpendicular to a horizontal plane. The outer omnidirectional projector 41, using the fish-eye lens thereof, emits light beams corresponding to the image data supplied from the wide-angle-image processing unit 33 towards the entire inner surface of the outer dome screen 42 having a shape of a hemispherical dome.

The light beams emitted by the outer omnidirectional projector 41 are received and scattered at points on the inner surface of the outer dome screen 42 having a shape of a hemispherical dome. Thus, on the inner surface of the outer dome screen 42 disposed over the user, an immersion image corresponding to the light beams emitted by the outer omnidirectional projector 41, i.e., the omnidirectional image of the object captured by the imaging system 1, is displayed.

The shape of the outer dome screen 42 is not limited to a hemispherical dome shape as long as the shape is such that the user is surrounded, and may be, for example, a cylinder shape, a cube shape, or another 3-dimensional shape that does not have a commonly recognized name.

Figure 8:
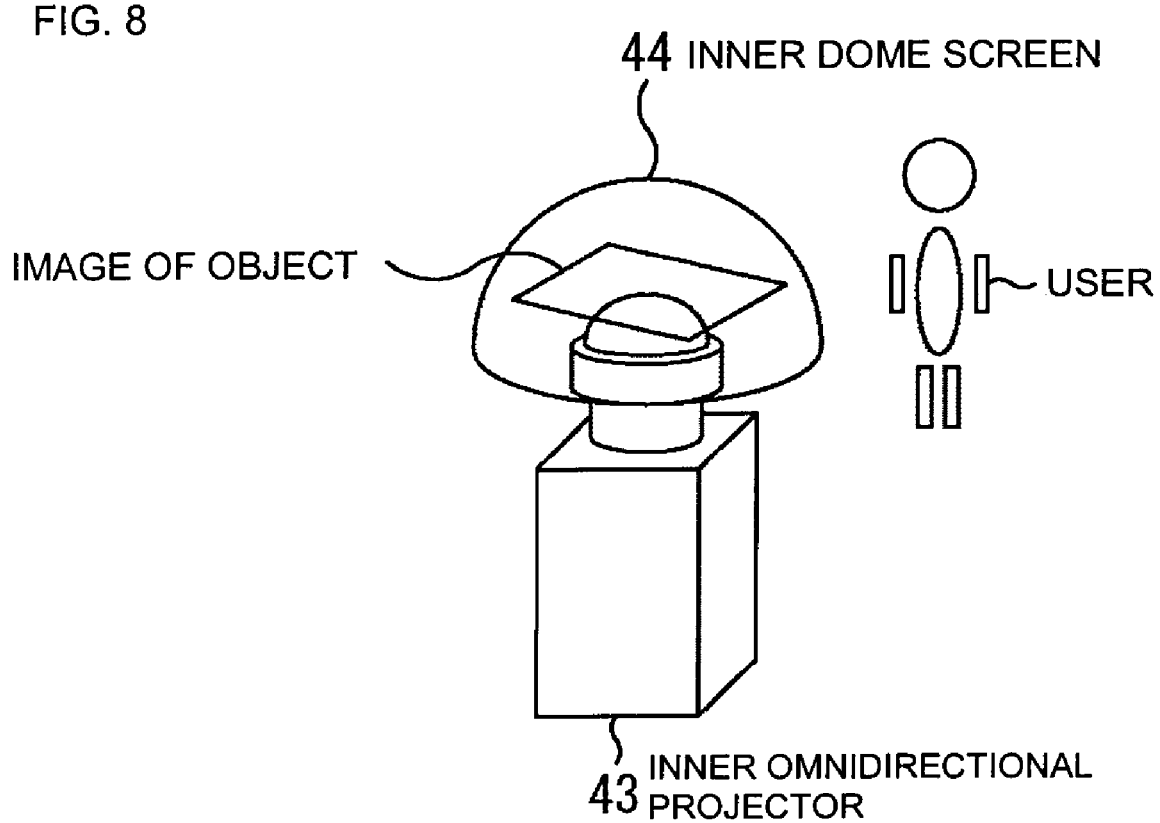
FIG. 8: Perspective view showing an example configuration of a surrounding-image display unit.

Next, FIG. 8 shows an example configuration of the surrounding-image display unit 36 shown in FIG. 6. The surrounding-image display unit 35 includes an inner omnidirectional projector 43 and an inner dome screen 44.

The inner omnidirectional projector 43, similar to the outer omnidirectional projector 41 shown in FIG. 7, is capable of emitting light beams over a wide angle, and is implemented, for example, by an ordinary projector and a fish-eye lens serving as an optical system that spreads light beams emitted by the projector over a wide angle.

The inner dome screen 44 has a predetermined shape of, for example, a hemispherical dome. On an inner (or outer) surface of the inner dome screen 44, for example, a coating material that causes light to be scattered is applied. Inside the inner dome screen 44, the inner omnidirectional projector 43 is disposed so that light beams will be emitted towards the inner surface of the inner dome screen 44.

More specifically, for example, the inner omnidirectional projector 43 is disposed so that an optical center thereof coincides with a center of the hemispherical dome serving as the inner dome screen 44 and so that an optical axis thereof is perpendicular to a horizontal plane. The inner omnidirectional projector 43, using the fish-eye lens thereof, emits light beams corresponding to the image data supplied from the wide-angle-image processing unit 33 towards the entire inner surface of the inner dome screen 44 having a shape of a hemispherical dome.

The light beams emitted by the inner omnidirectional projector 43 are received and scattered at points on the inner surface of the inner dome screen 44 having a shape of a hemispherical dome. The inner dome screen 44 itself is composed of a transparent material. The light beams emitted by the inner omnidirectional projector 43 are scattered on the inner surface of the inner dome screen 44, whereby a bird's eye image corresponding to the light beams emitted by the inner omnidirectional projector 43, i.e., an image of the object as viewed from a certain viewpoint, captured by the imaging system 1, is displayed on the outer surface of the inner dome screen 44 by what is called back projection.

Although the shape of the inner dome screen 44 in this example is a hemispherical dome, which is similar to the shape of the outer dome screen 42 shown in FIG. 7, the shape of the inner dome screen 44 need not be similar to the shape of the outer dome screen 42. That is, the shape of the inner dome screen 44 may be, for example, a cylindrical shape, a polygonal-prism shape, or another shape that does not have a commonly recognizable name, independent of the shape of the outer dome screen 42.

Figure 9:
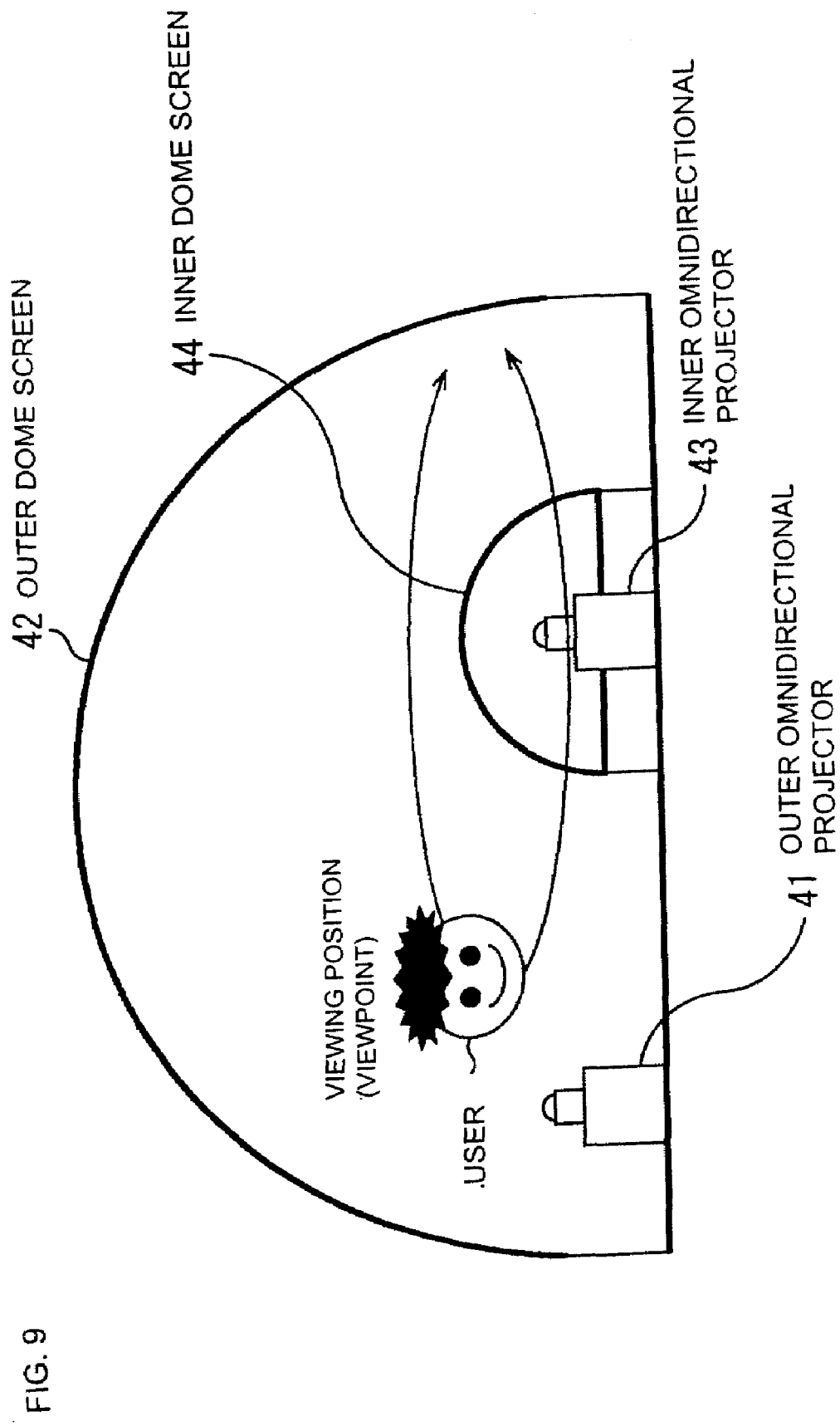
FIG. 9: Diagram illustrating the relationship of positions of an outer dome screen and an inner dome screen.

FIG. 9 shows the relationship of positions where the outer dome screen 42 (FIG. 7) and the inner dome screen 44 are disposed. As described earlier, the outer dome screen 42 is disposed so as to surround the user, and the inner dome screen 44 is disposed inside the outer dome screen 42. The use of the term "surround" in this context means that the outer dome screen 42 need not necessarily encapsulate the user, but merely give the user a sense of being contained within the space defined by the outer dome screen 42. For example, the outer dome screen 42 preferable rests on the same surface that the user is standing on. However, the outer dome screen 42 may also be suspended, or supported in another way so that the outer dome screen 42 is elevated by some extent (e.g., an inch or two, up to a few feet).

Thus, the user in a region inside the outer dome screen 42 and outside the inner dome screen 44 is allowed to simultaneously view the immersion image displayed on the inner surface of the outer dome screen 42 and the bird's-eye image displayed on the outer surface of the inner dome screen 44. Accordingly, the user is allowed to experience a sense of immersion provided by the immersion image and to readily grasp his/her own position by the bird's-eye image.

More specifically, for example, an immersion image of the scenery of the stand of the soccer stadium is displayed on the inner surface of the outer dome screen 42, and what is going on in the match on the soccer field as viewed from a viewpoint of the user is displayed on the outer surface of the inner dome screen 44. Accordingly, the user is allowed to experience a sense of presence as if the user is actually watching the soccer match in the soccer stadium.

Figure 10:
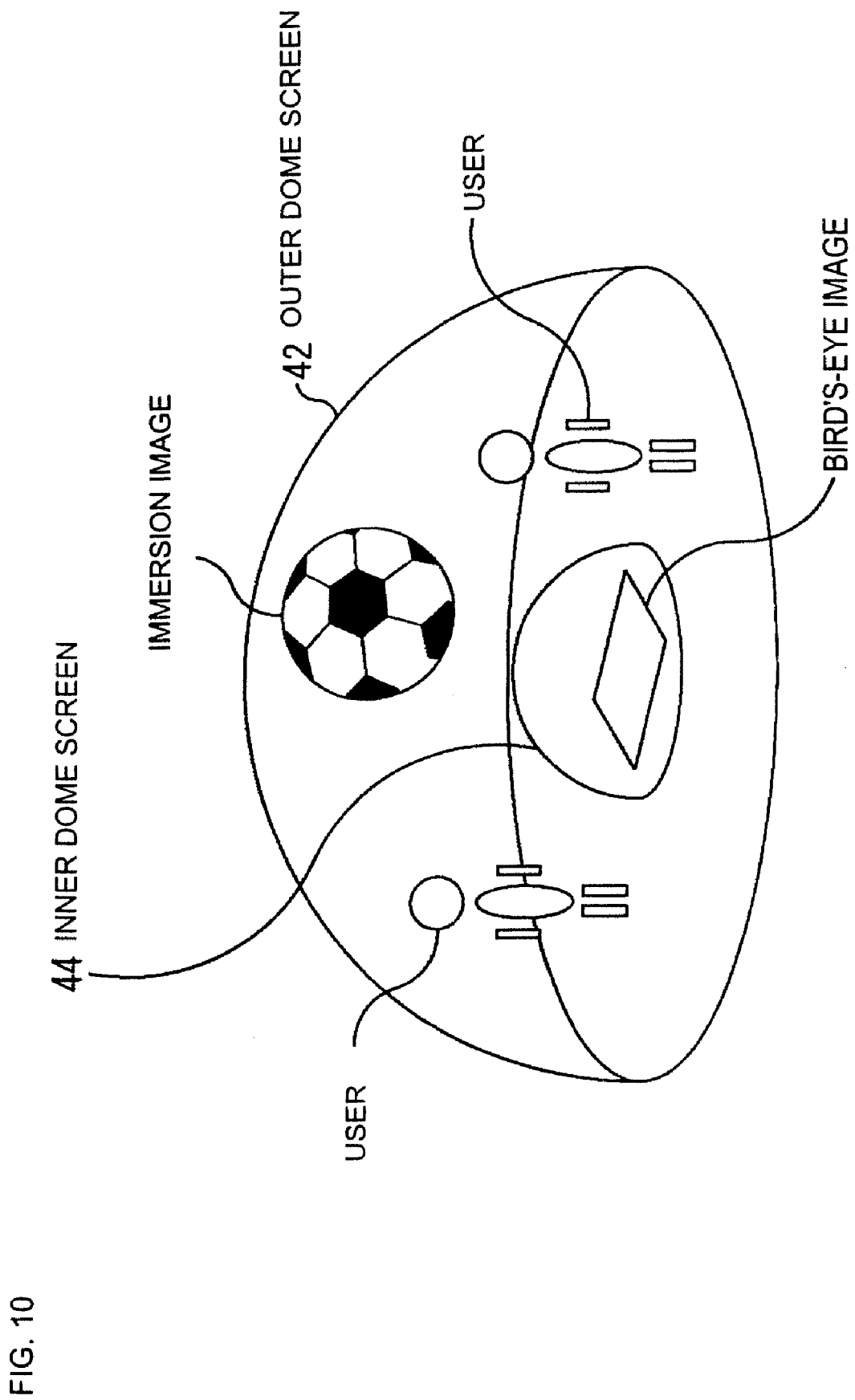
FIG. 10: Diagram illustrates a case where a plurality of users are viewing images.

As shown in FIG. 10, not only one, but a plurality of users can be accommodated inside the outer dome screen 42. Thus, with the display system 2, a plurality of users is allowed to simultaneously view the immersion image displayed on the outer dome screen 42 and the bird's-eye image displayed on the inner dome screen 44.

Figure 11:
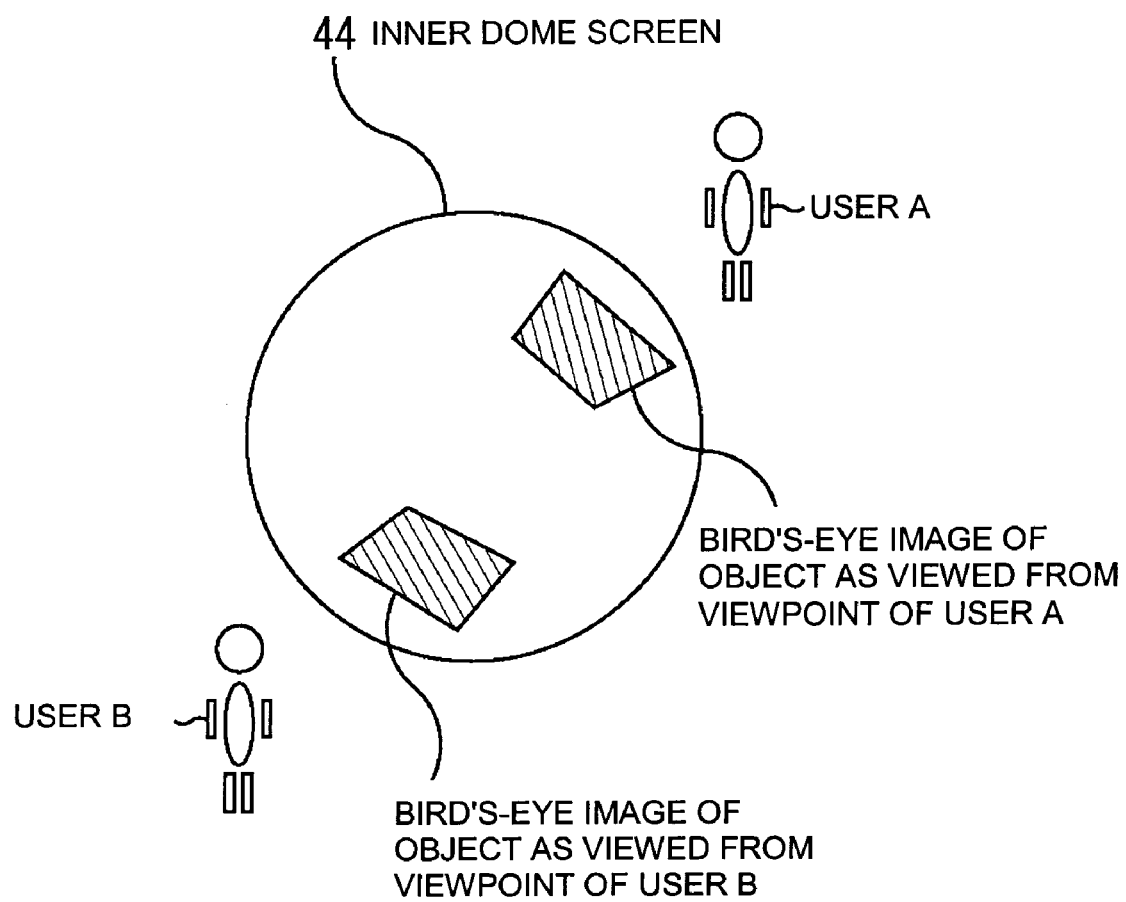
FIG. 11: Diagram showing a case where images of an object as viewed from respective viewpoints of a plurality of users are presented to the users.

For example, if two users A and B are present inside the outer dome screen 42 and if the users A and B are at different positions as shown in FIG. 11, the inner dome screen 44 presents the user A with a bird's-eye image of the object as viewed from a viewpoint of the user A while presenting the user B with a bird's-eye image of the object as viewed from a viewpoint of the user A.

That is, in the display system 2, the inner dome screen 44 presents each user with a bird's-eye image of the object as viewed from a viewpoint of the user.

Figure 12:
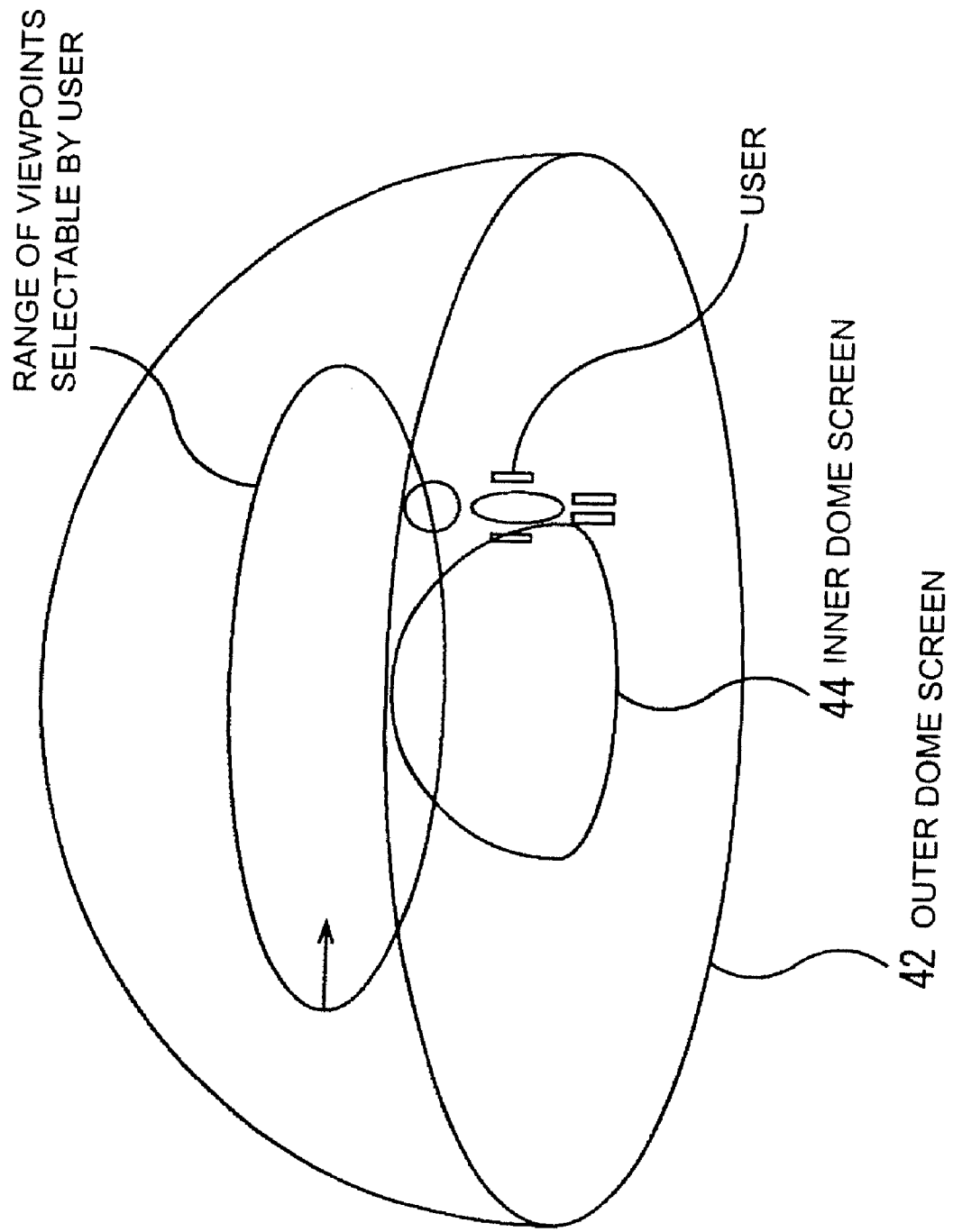
FIG. 12: Diagram showing a horizontal parallax system.
Figure 13:
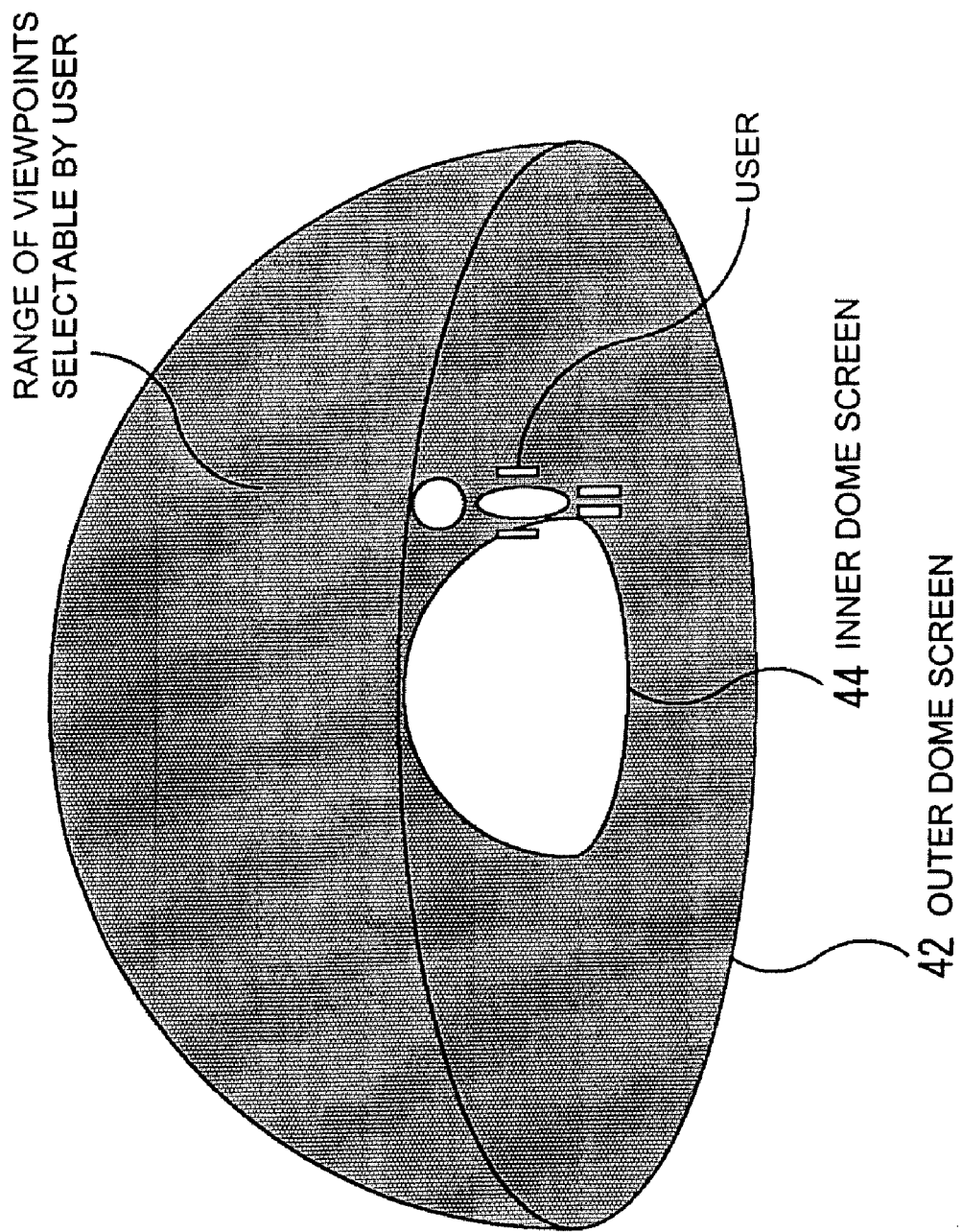
FIG. 13: Diagram showing a vertical-and-horizontal parallax system.

Thus, the user is allowed to view an image (bird's-eye image) of the object as viewed from his/her viewpoint, and has the freedom for selecting a viewpoint. Viewpoint positions that can be selected by the user may be, for example, limited to positions in a horizontal plane at a certain height inside the outer dome screen 42, as shown in FIG. 12, or may be, for example, any positions inside the outer dome screen 42 without such a limitation, as shown in FIG. 13. The system in which viewpoints are limited to positions on a certain horizontal plane, as shown in FIG. 12, can be called a horizontal parallax system since the user is allowed to move his/her viewpoint only in horizontal directions. The system in which viewpoints may be at any position, as shown in FIG. 13, can be called a vertical-and-horizontal parallax system since the user is allowed to move his/her viewpoint in any vertical and horizontal direction.

Figure 14:
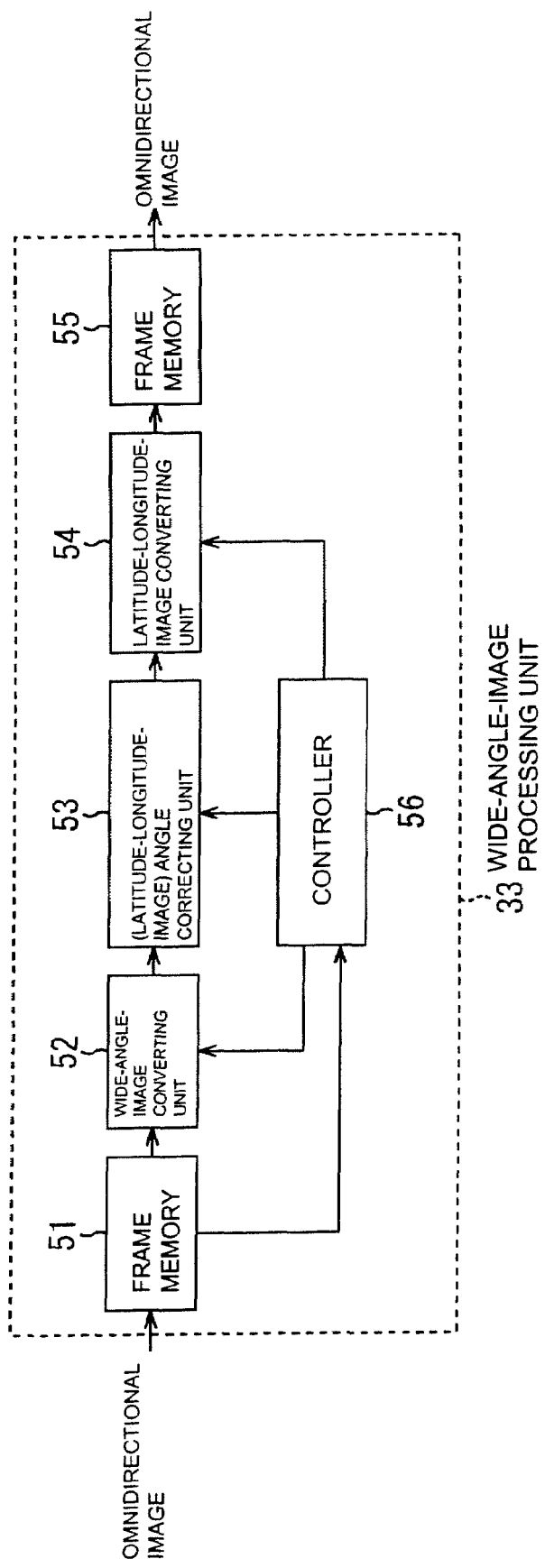
FIG. 14: Block diagram showing an example configuration of a wide-angle-image processing unit.

FIG. 14 shows an example configuration of the wide-angle-image processing unit 33 shown in FIG. 6. The frame-by-frame omnidirectional-image data output from the demultiplexer 32 is supplied to a frame memory 51. The frame memory 51 stores, on a frame-by-frame basis, the omnidirectional-image data supplied from the demultiplexer 32, and reads the omnidirectional image data on a frame-by-frame basis and supplies it to a wide-angle-image converting unit 52. The frame memory 51 includes a plurality of memory banks, and it allows simultaneous storing and reading of omnidirectional-image data by switching of the banks.

The wide-angle-image converting unit 52, under the control of a controller 56, converts the omnidirectional-image data supplied from the frame memory 51 into latitude-longitude-image data representing a rectangular region on a plane defined by a latitudinal direction and a longitudinal direction, and supplies it to an image-angle correcting unit 53.

The image-angle correcting unit 53, under the control of the controller 56, corrects the latitude-longitude-image data supplied from the wide-angle-image converting unit 52, based on optical characteristics of the outer omnidirectional projector 41 of wide-angle-image display unit 34 (FIG. 7), and supplies the latitude-longitude-image data having been corrected to a latitude-longitude-image converting unit 54.

The latitude-longitude-image converting unit 54, under the control of the controller 56, converts the latitude-longitude-image data supplied from the image-angle correcting unit 53 into omnidirectional-image data, and supplies it to a frame memory 55.

The frame memory 55 stores, on a frame-by-frame basis, the omnidirectional-image data supplied from the latitude-longitude-image converting unit 54, and reads the omnidirectional-image data on a frame-by-frame basis and supplies it to the outer omnidirectional projector 41 of the wide-angle-image display unit 34 (FIG. 7). The frame memory 55, similarly to the frame memory 51, includes a plurality of memory banks, and it allows simultaneous storing and reading of omnidirectional-image data by switching of the banks.

The controller 56, based on the status of storage of omnidirectional-image data in the frame memory 51, controls the wide-angle-image converting unit 52, the image-angle correcting unit 53, and the latitude-longitude-image converting unit 54.

Next, processing that is executed by the wide-angle-image converting unit 52, the image-angle correcting unit 53, and the latitude-longitude-image converting unit 54 shown in FIG. 14 will be described with reference to FIGS. 15 to 17.

The wide-angle-image converting unit 52 receives omnidirectional-image data stored in the frame memory 51, i.e., omnidirectional-image data captured by the omnidirectional camera 21 constituting the wide-angle imaging unit 11 shown in FIG. 3.

Figure 15:
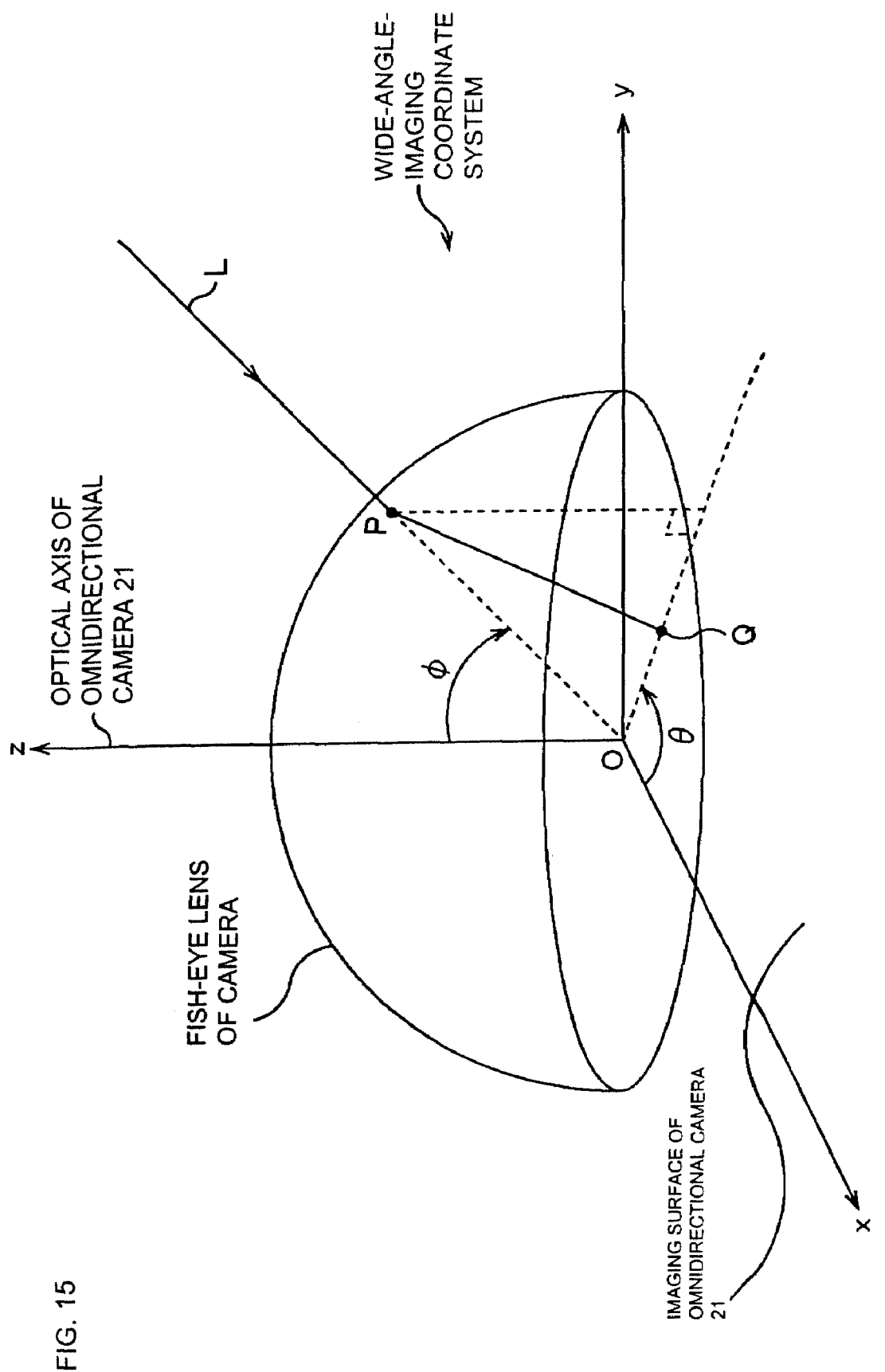
FIG. 15: Diagram showing a wide-angle-imaging coordinate system.
Figure 16:
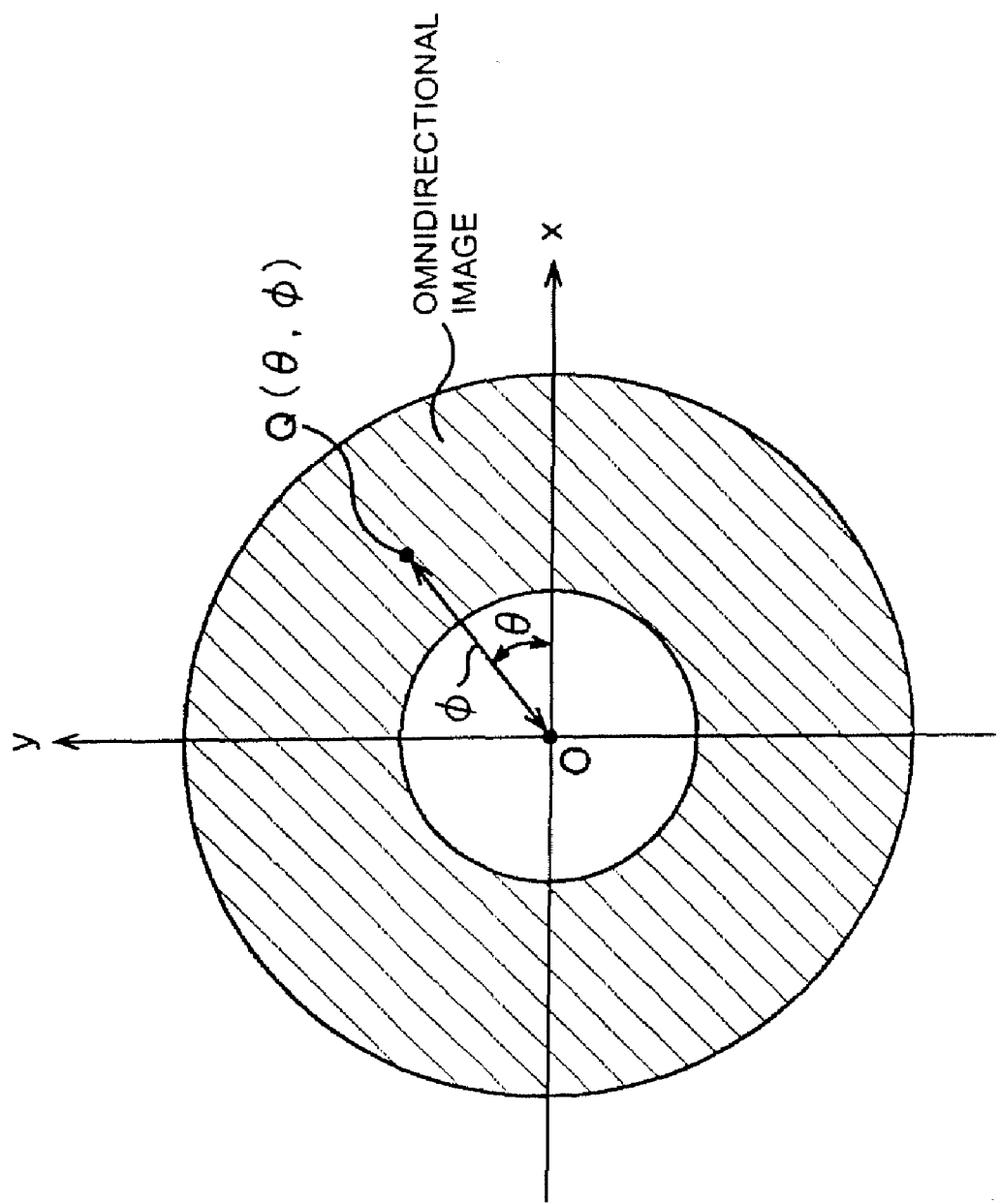
FIG. 16: Diagram showing an omnidirectional image.

Now, letting a three-dimensional coordinate system shown in FIG. 15, in which an optical axis of the omnidirectional camera 21 constitutes a z axis and in which an imaging surface (photoreceptor surface) of the omnidirectional camera 21 constitutes an xy plane, be referred to as a wide-angle-imaging coordinate system, the relationship between light beams that are incident on the omnidirectional camera 21 and omnidirectional-image data captured by the omnidirectional camera 21 receiving the light beams will be considered in the wide-angle-imaging coordinate system.

The light beams L emitted toward the omnidirectional camera 21 are refracted by the fish-eye lens thereof and becomes incident on the imaging surface of the omnidirectional camera 21. That is, the fish-eye lens refracts the light beams L in a plane including the Z axis of the wide-angle-imaging coordinate system and the light beams L so that the light beams L will be incident on the xy plane. Thus, the omnidirectional camera 21 captures, as omnidirectional-image data, image data representing, for example, a circular region or a doughnut-shaped region shown as hatched in FIG. 16.

Now, with regard to the wide-angle-imaging coordinate system, let an angle with respect to the x axis on the xy plane be referred to as a longitude θ, an angle with respect to the z axis be referred to as a latitude φ, and the direction of a point with the longitude θ and the latitude φ be denoted as a direction (θ, φ), as shown in FIG. 15. Then, a light beam L that is incident on the omnidirectional camera 21 from the direction (θ, φ) is refracted by the fish-eye lens of the omnidirectional camera 21 in accordance with the latitude φ.

Let the light beam L that is incident from the direction (θ, φ) be denoted as a light beam L(θ, φ), and a point on the xy plane to which the light beam L(θ, φ) is projected as Q(x, y). Then, the longitude θ and the latitude φ can be expressed by the following equations using the x and y coordinates of the point Q.

$$\theta = \tan^{-1} \frac{y}{x} \quad (1)$$

$$\phi = f_1\left(\sqrt{x^2 + y^2}\right) \quad (2)$$

In equation (2), the function $f_1(\ )$ is determined according to optical characteristics of the fish-eye lens of the omnidirectional camera 21. Letting the inverse function of the function $f_1(\ )$ be denoted as $f_1^{-1}(\ )$, equation (2) can be rewritten as $\sqrt{(x^2+y^2)}=f_1^{-1}(\theta)$. A fish-eye lens for which the inverse function $f_1^{-1}(\theta)$, representing the optical characteristics of the fish-eye lens, can be expressed as (the focal length of the fish-eye lens)×θ is called an equidistance projection method.

From equations (1) and (2), a point Q(x, y) of the omnidirectional image captured by the omnidirectional camera 21 can be expressed using a longitude θ and a latitude φ representing a direction of a light beam L (θ, φ) that is incident on that point.

More specifically, an angle that is formed by a line connecting the point Q(x, y) and the origin O with respect to the x axis is equal to the longitude θ of the light beam L. The distance between the point Q(x, y) and the origin O, $\sqrt{(x^2+y^2)}$, depends on the latitude φ of the light beam L. The longitude θ and the latitude φ are values independent of each other.

Thus, for example, assuming a latitude-longitude coordinate system that is a two-dimensional coordinate system with the longitude θ on the horizontal axis and the latitude φ on the vertical axis, a pixel Q(x, y) constituting the omnidirectional-image data can be projected to a point Q'(θ, φ) on the latitude-longitude coordinate system.

Figure 17:
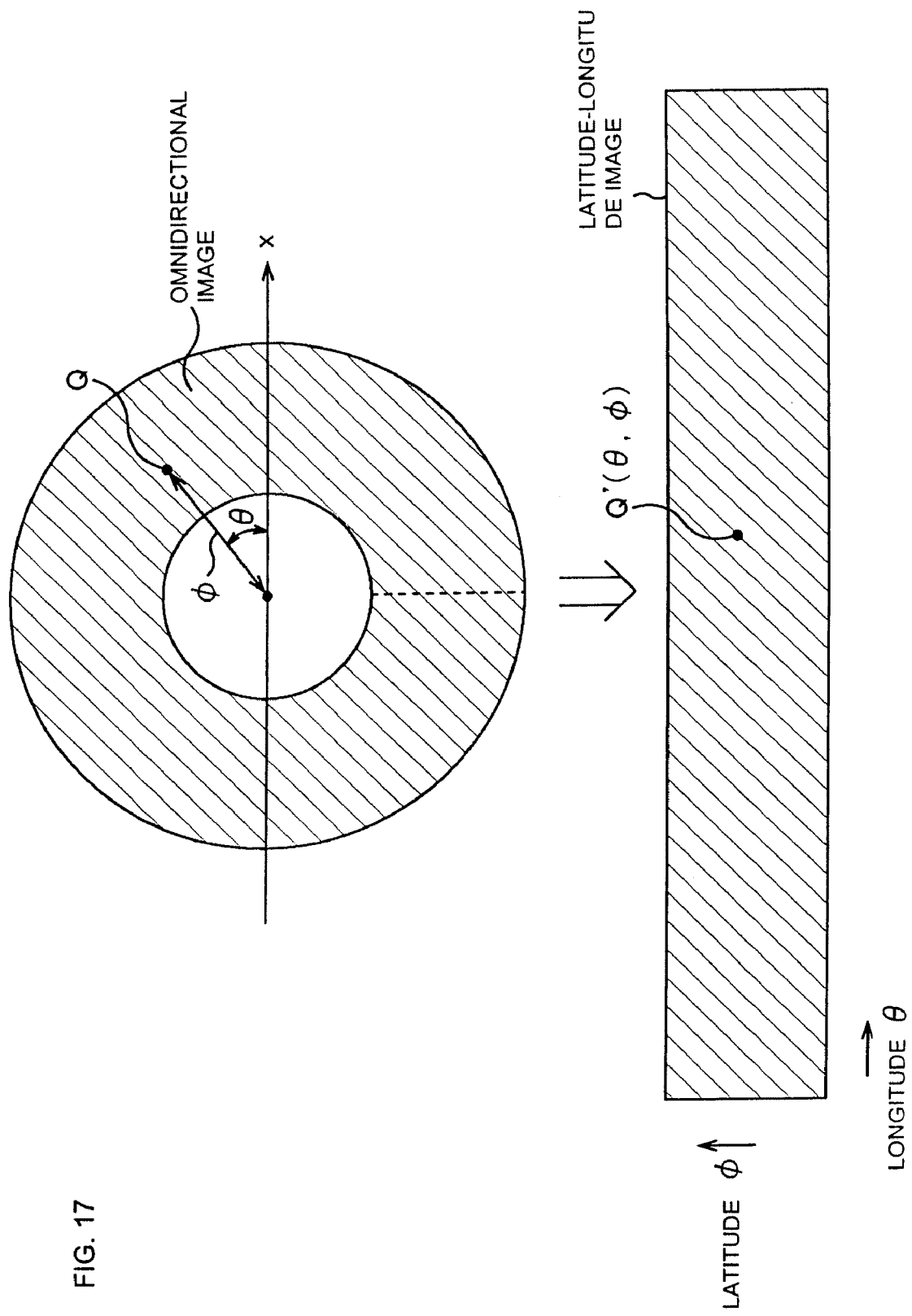
FIG. 17: Diagram showing an omnidirectional image and a longitude-latitude image.

By projecting the omnidirectional-image data onto the latitude-longitude coordinate system, the omnidirectional-image data representing a doughnut-shaped region is converted into image data representing a rectangular region defined by the longitude θ and the latitude φ, i.e., latitude-longitude-image data, as shown in FIG. 17.

The wide-angle-image converting unit 52 shown in FIG. 14 converts omnidirectional-image data into latitude-longitude-image data in the manner described above.

If the optical characteristics of the fish-eye lens of the omnidirectional camera 21 of the wide-angle imaging unit 11 (FIG. 3) for capturing an omnidirectional image are the same as the optical characteristics of the fish-eye lens of the outer omnidirectional projector 41 of the wide-angle-image display unit 34 (FIG. 7) for emitting light beams corresponding to the omnidirectional image, when omnidirectional-image data captured by the omnidirectional camera 21 is supplied to the outer omnidirectional projector 41 as it is, the outer omnidirectional projector 41 emits light beams that are different from light beams that are incident on the omnidirectional camera 21 only in that the directions are opposite. Thus, theoretically, the outer dome screen 42 (FIG. 7), which receives the light beams from the outer omnidirectional projector 41, displays the same image of the scenery, etc. as captured by the omnidirectional camera 21.

However, the optical characteristics of the fish-eye lenses of the omnidirectional camera 21 (FIG. 3) and the outer omnidirectional projector 41 (FIG. 7) are not necessarily the same and may differ from each other.

The point Q(x, y) on the imaging surface that a light beam L(θ, φ) incident on the omnidirectional camera 21 reaches is related to the longitude θ and the latitude φ as expressed in equations (1) and (2).

The longitude θ expressed by equation (1) is not affected by the optical characteristics of the fish-eye lens. On the other hand, the latitude φ expressed in equation (2) is calculated using the function $f_1(\ )$, and since the inverse function $f_1^{-1}(\ )$ of the function $f_1(\ )$ represents the optical characteristics of the fish-eye lens as described earlier, the latitude φ is affected by the optical characteristics of the fish-eye lens.

Thus, when the optical characteristics of the fish-eye lenses of the omnidirectional camera 21 (FIG. 3) and the outer omnidirectional projector 41 (FIG. 7) differ from each other, in order that the image displayed on the outer dome screen 42 (FIG. 7) be the same as the image of the scenery, etc. as captured by the omnidirectional camera 21, the omnidirectional-image data captured by the omnidirectional camera 21 must be corrected with respect to the direction of the latitude φ.

Since the direction of the latitude φ of the omnidirectional-image data is along the direction of the vertical axis of the latitude-longitude-image data shown in FIG. 17, the image-angle correcting unit 53 shown in FIG. 14 corrects the latitude φ on the vertical axis of the latitude-longitude-image data supplied from the wide-angle-image converting unit 52 into a latitude φ', for example, according to the following equation.

$$\phi' = \alpha\phi \quad (3)$$

In equation (3), α is a value that is determined by the optical characteristics of the fish-eye lenses of the omnidirectional camera 21 (FIG. 3) and the outer omnidirectional projector 41 (FIG. 7).

Thus, letting a pixel constituting the latitude-longitude-image data supplied from the wide-angle-image converting unit 52 be denoted as Q'(θ, φ), the image-angle correcting unit 53 corrects the pixel Q'(θ, φ) into a pixel Q'(θ, φ').

The latitude φ, which represents the direction of the vertical axis of the latitude-longitude-image data as shown in FIG. 17, corresponds to an image angle in the vertical direction of the latitude-longitude-image data. Thus, the correction of the latitude φ corresponds to increasing or decreasing the image angle in the vertical direction of the latitude-longitude-image data.

If the latitude-longitude-image data representing a rectangular region is supplied as it is to the outer omnidirectional projector 41 (FIG. 7), the outer dome screen 42 does not display the omnidirectional image captured by the omnidirectional camera 21 (FIG. 3). Thus, the latitude-longitude-image converting unit 54 shown in FIG. 14 converts the latitude-longitude-image data with the latitude φ thereof having been corrected in the image-angle correcting unit, back into omnidirectional-image data representing a doughnut-shaped region as shown in FIG. 16 (or a circular region). In the omnidirectional-image data yielded by the latitude-longitude-image converting unit 54, the scale along the direction of the latitude φ has been corrected based on the optical characteristics of the fish-eye lenses of the omnidirectional camera 21 (FIG. 3) and the outer omnidirectional projector 41 (FIG. 7). Thus, when the omnidirectional-image data is supplied to the outer omnidirectional projector 41 (FIG. 7), the outer dome screen 42 displays the omnidirectional image captured by the omnidirectional camera 21 (FIG. 3).

Figure 18:
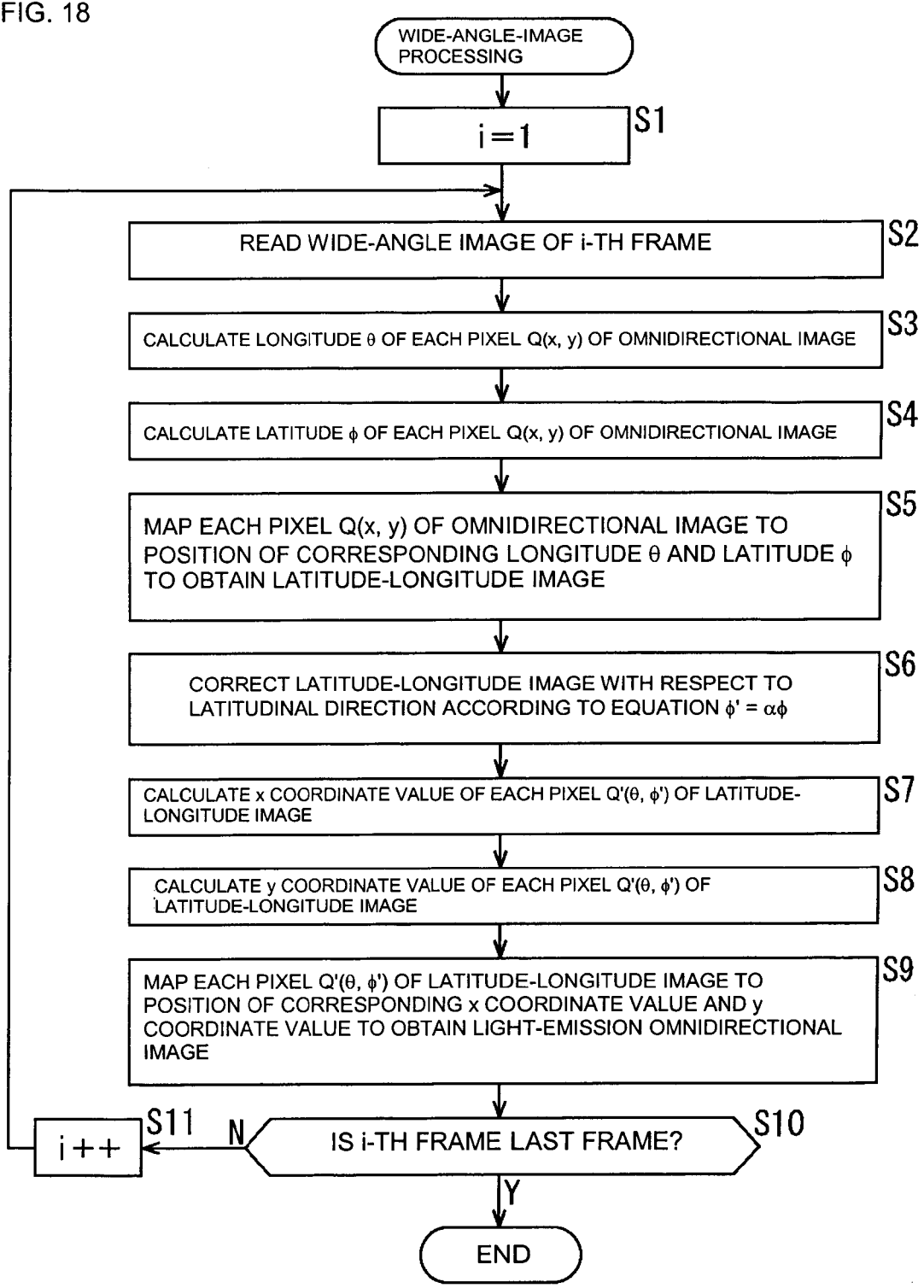
FIG. 18: Flowchart for explaining wide-angle-image processing.

Next, processing that is executed in the wide-angle-image processing unit 33 shown in FIG. 14 (wide-angle-image processing) will be described with reference to a flowchart shown in FIG. 18.

The controller 56 monitors the frame memory 51, and it starts wide-angle-image processing when the frame memory 51 starts storing omnidirectional-image data.

More specifically, in the wide-angle-image processing, first in step S1, the controller 56 sets an initial value, for example, 1, in a variable i for counting the number of frames, and the processing then proceeds to step S2. In step S2, the frame memory 51 reads omnidirectional-image data of an i-th frame stored therein, and supplies it to the wide-angle-image converting unit 52. The processing then proceeds to step S3.

In step S3, the wide-angle-image converting unit 52 calculates, according to equation (1), a longitude θ for each pixel Q(x, y) constituting the omnidirectional-image data supplied from the frame memory 51, and the processing then proceeds to step S4. In step S4, the wide-angle-image converting unit 52 calculates, according to equation (2), a latitude φ for each pixel Q(x, y) constituting the omnidirectional-image data supplied from the frame memory 51, and the processing then proceeds to step S5.

In step S5, the wide-angle-image converting unit 52 maps each pixel Q(x, y) constituting the omnidirectional-image data supplied from the frame memory 51 to a point (θ, φ) on the latitude-longitude coordinate system, represented by the longitude θ and the latitude φ that have been calculated for the pixel Q(x, y), thereby converting the omnidirectional-image data representing a doughnut-shaped region into latitude-longitude-image data representing a rectangular region, as shown in FIG. 17.

The wide-angle-image converting unit 52, having obtained the latitude-longitude-image data in step S5 as described above, supplies the latitude-longitude-image data to the image-angle correcting unit 53, and the processing then proceeds to step S6.

In step S6, the image-angle correcting unit 53 corrects the latitude $\phi$ of the latitude-longitude-image data supplied from the wide-angle-image converting unit 52 into a latitude $\phi'$ according to equation (3), and supplies latitude-longitude-image data represented by the corrected latitude $\phi'$ and the longitude $\theta$ to the latitude-longitude-image converting unit 54. The processing then proceeds to step S7.

In step S7, the latitude-longitude-image converting unit 54 calculates, according to equation (4) (see below), an x coordinate on the xy plane of the wide-angle-imaging coordinate system, for each pixel $Q'(\theta, \phi')$ constituting the longitude-latitude-image data supplied from the image-angle correcting unit 53, and the processing then proceeds to step S8.

In step S8, the latitude-longitude-image converting unit 54 calculates, according to equation (5), a y coordinate on the xy plane of the wide-angle-imaging coordinate system, for each pixel $Q'(\theta, \phi')$ constituting the longitude-latitude-image data supplied from the image-angle correcting unit 53, and the processing then proceeds to step S9.

$$x = f_2(\phi')\cos\theta \quad (4)$$

$$y = f_2(\phi')\sin\theta \quad (5)$$

The function $f_2(\phi')$ in equations (4) and (5) represents the optical characteristics of the outer omnidirectional projector 41 (FIG. 7) (a function that is determined by a projection method of the fish-eye lens of the outer omnidirectional projector 41). Solving equations (1) and (2) yields equations similar to equations (4) and (5).

In step S9, the latitude-longitude-image converting unit 54 maps each pixel $Q'(\theta, \phi')$ constituting the longitude-latitude-image data supplied from the image-angle correcting unit 53 to a point (x, y) on the xy plane of the wide-angle-imaging coordinate system, represented by the x and y coordinates obtained for the pixel $Q'(\theta, \phi')$, thereby converting the latitude-longitude-image data representing a rectangular region into omnidirectional-image data representing a doughnut-shaped region. The omnidirectional-image data is supplied to and stored in the frame memory 55, as light-emission omnidirectional-image data for causing the outer omnidirectional projector 41 (FIG. 7) to emit light.

The light-emission omnidirectional-image data stored in the frame memory 55 as described above is sequentially read and supplied to the wide-angle-image display unit 34 (FIG. 6). In the wide-angle-image display unit 34, the outer omnidirectional projector 41 (FIG. 7) emits light beams corresponding to the light-emission omnidirectional-image data, and the outer dome screen 42 (FIG. 7) receives the light beams, whereby the outer dome screen 42 displays, as an immersion image, an image of the scenery in all directions around the object, captured by the omnidirectional camera 21 (FIG. 3).

Then, the processing proceeds to step S10, in which the controller 51 refers to the frame memory 51 to determine whether the i-th frame is the last frame. If it is determined in step S110 that the i-th frame is not the last frame, that is, if omnidirectional-image data of a frame subsequent to the i-th frame is stored in the frame memory 51, the processing proceeds to step S11, in which the controller 56 increments the variable i by 1. The processing then returns to step S2, and similar the same processing is repeated.

On the other hand, if it is determined in step S10 that the i-th frame is the last frame, that is, if omnidirectional-image data of a frame subsequent to the i-th frame is not stored in the frame memory 51, the wide-angle-image process is stopped.

If the omnidirectional camera 21 (FIG. 3) and the outer omnidirectional projector 41 (FIG. 7) have the same optical characteristics, omnidirectional-image data output by the demultiplexer 32 (FIG. 6) may be directly supplied to the wide-angle-image display unit 34 as light-emission omnidirectional-image data, bypassing the wide-angle-image processing unit 33 shown in FIG. 14.

Next, an overview of the surrounding-image processing unit 35 shown in FIG. 6 will be described. In the surrounding-image display unit 36 (FIG. 6), the inner dome screen 44 (FIG. 8) presents the user with an image of the object as viewed from a viewpoint of the user, as described earlier. If a plurality of users exists, the inner dome screen 44 (FIG. 8) presents the plurality of users with images of the object as viewed from the respective viewpoints of the users.

Figure 19:
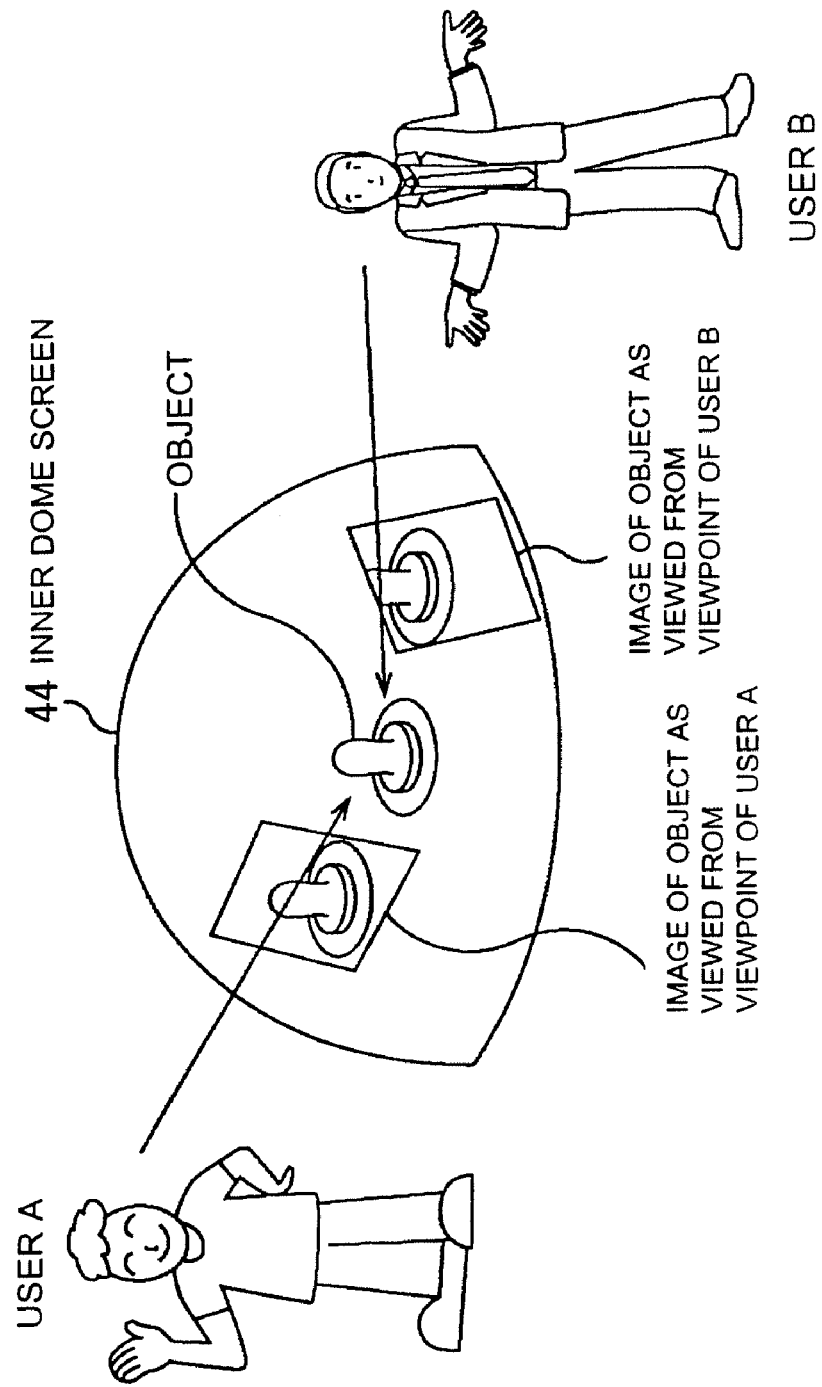
FIG. 19: Diagram for explaining an image that is displayed on an inner dome screen.

Thus, if the inner dome screen 44 is transparent and if the object imaged by the surrounding imaging unit 12 (FIG. 2) exists inside the inner dome screen 44, the inner dome screen 44 displays the same image of the object as perceived by the vision of each user, as shown in FIG. 19.

More specifically, in the embodiment shown in FIG. 19, two users A and B are present, and the inner dome screen 44 displays an image of the object as viewed from a viewpoint of the user A at a point where a straight line connecting the center of the inner dome screen 44 and the viewpoint of the user A intersects the inner dome screen 44. Furthermore, the inner dome screen 44 displays an image of the object as viewed from a viewpoint of the user B at a point where a straight line connecting the center of the inner dome screen 44 and the viewpoint of the user B intersects the inner dome screen 44.

Figure 20:
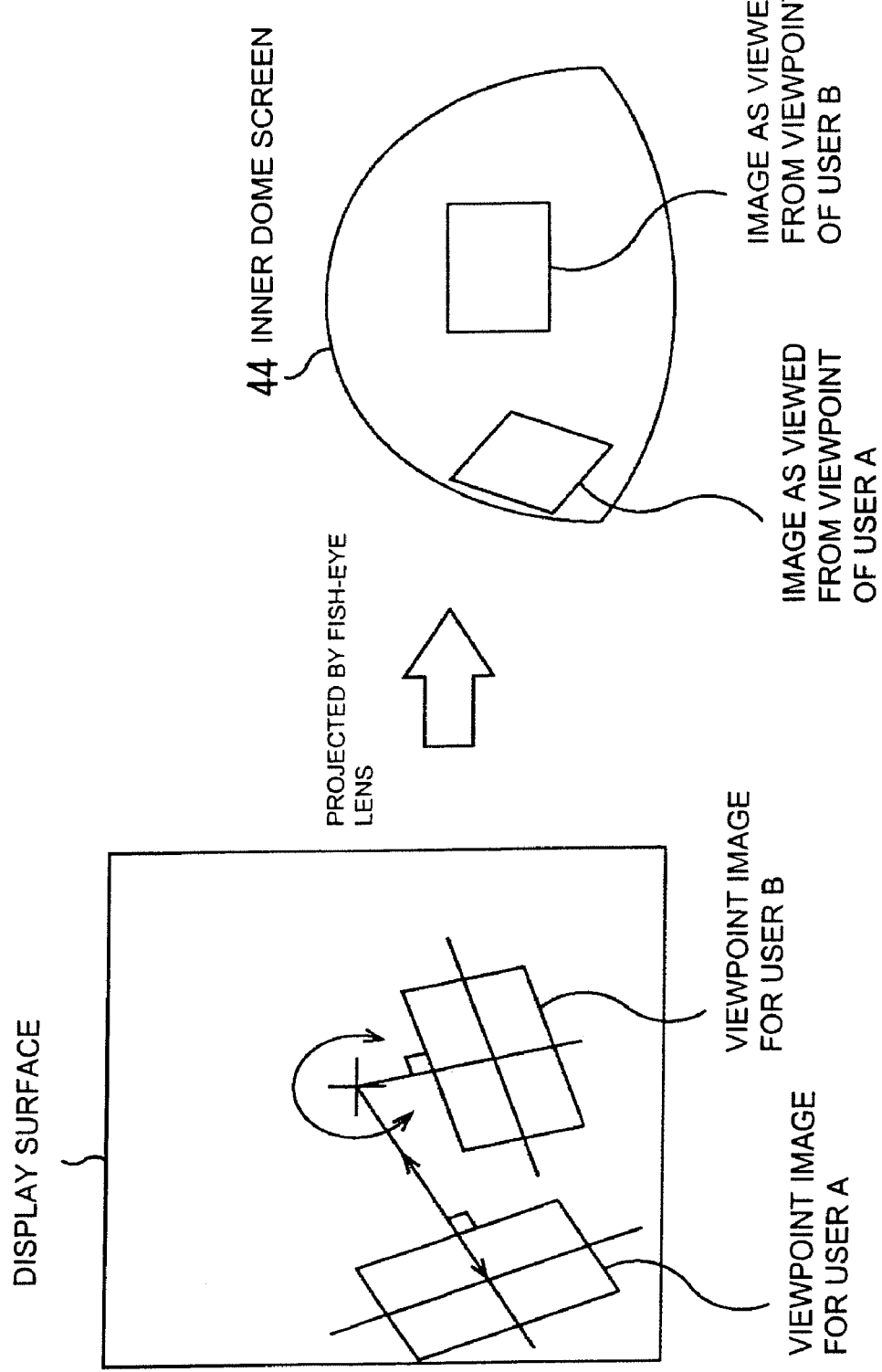
FIG. 20: Diagram showing an image that is displayed on a display surface of an inner omnidirectional projector and an image that is displayed on the inner dome screen.

Thus, in the surrounding display unit 36 shown in FIG. 8, for example, as shown in FIG. 20, the inner omnidirectional projector 43 displays an image of the object as viewed from a viewpoint of each user (hereinafter referred to as a viewpoint image when appropriate) on a display surface of, for example, a liquid crystal panel that is not shown, and emits light beams corresponding to the viewpoint image through the fish-eye lens. Accordingly, the inner dome screen 44 presents each user with an image of the object as viewed from a viewpoint of the user.

The surrounding-image processing unit 35 shown in FIG. 6, using the surrounding-image data supplied from the demultiplexer 32, generates an image of the object as viewed from each viewpoint supplied from the viewpoint detecting unit 37 (viewpoint image), and maps the viewpoint image associated with each viewpoint to a position in accordance with the viewpoint, thereby generating a light-emission image corresponding to light beams to be emitted by the inner omnidirectional projector 43 (FIG. 8), i.e., a light-emission image to be displayed on the display surface of the inner omnidirectional projector 43 (hereinafter also referred to as a display image).

Figure 21:
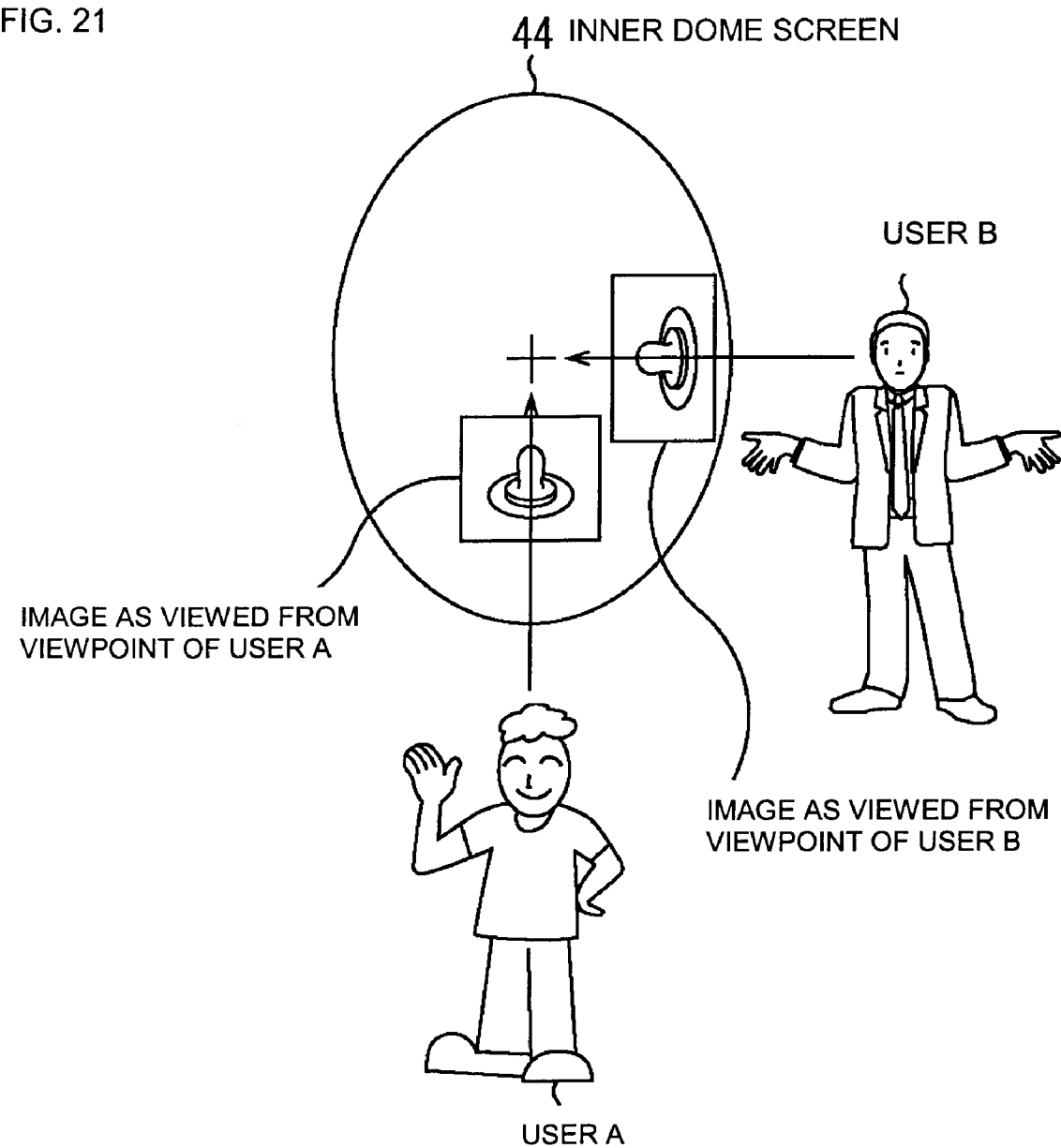
FIG. 21: Diagram showing a case where viewpoints of users A and B are remote from each other.

When the users A and B are distant and viewpoints of the users A and B are therefore distant from each other, for example, as shown in FIG. 21, even if the inner dome screen 44 presents the users A and B with images of the object as viewed from their respective viewpoints (viewpoint images), the user A is allowed to view only the viewpoint image associated with the viewpoint of the user A while the user B is allowed to view only the viewpoint image associated with the viewpoint of the user B.

That is, the viewpoint image associated with the viewpoint of the user B is not seen by the user A, or is seen only to an extent such that viewing of the viewpoint image associated with the viewpoint of the user A is not interfered. Similarly, the viewpoint image associated with the user A is not seen by the user B, or is seen only to an extent such that viewing of the viewpoint image associated with the viewpoint of the user B is not interfered.

Figure 22:
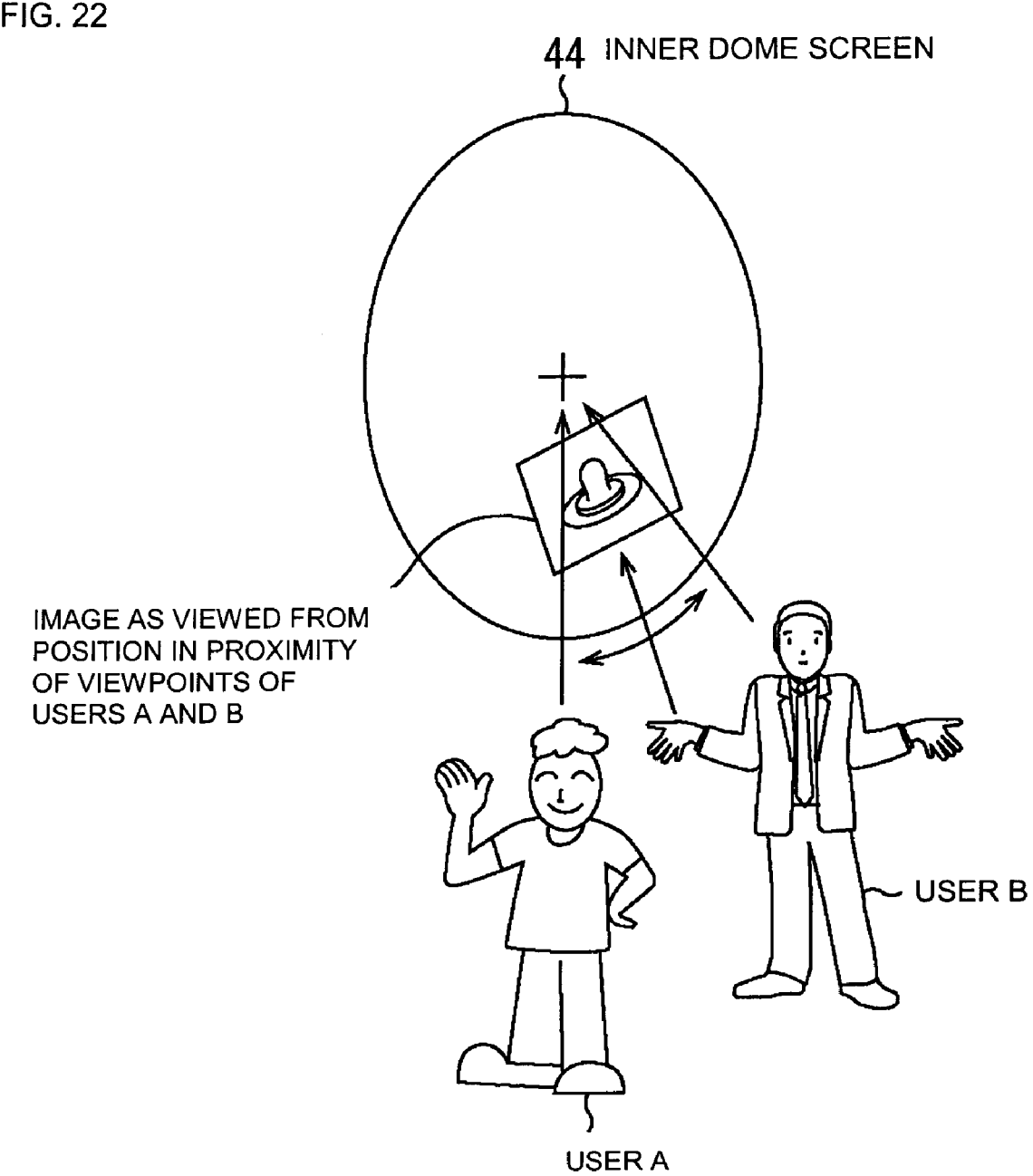
FIG. 22: Diagram showing a case where viewpoints of users A and B are close to each other.

On the other hand, when the users A and B are close to each other, for example, as shown in FIG. 22, their viewpoints are also close to each other, so that viewpoint images displayed on the inner dome screen 44 respectively for the users A and B could overlap each other. Even if the viewpoint images displayed on the inner dome screen 44 respectively for the users A and B do not overlap each other, the viewpoint images for the users A and B are displayed in proximity to each other on the inner dome screen 44. Thus, the viewpoint image associated with the viewpoint of the user B interferes with viewing by the user A of the viewpoint image associated with the viewpoint of the user A, and the viewpoint image associated with the viewpoint of the user A interferes with viewing by the user B of the viewpoint image associated with the viewpoint of the user B.

Thus, when the distance between the viewpoints of the users A and B is short, the surrounding-image processing unit 35 sets a common viewpoint for the users A and B at a position close to both of the viewpoints of the users A and B, and generates an image of the object as viewed from that viewpoint (viewpoint image). In that case, as shown in FIG. 22, the inner dome screen 44 presents both of the users A and B with an image of the object as viewed from the common viewpoint, so that image viewing by the users A and B is not interfered with.

Figure 23:
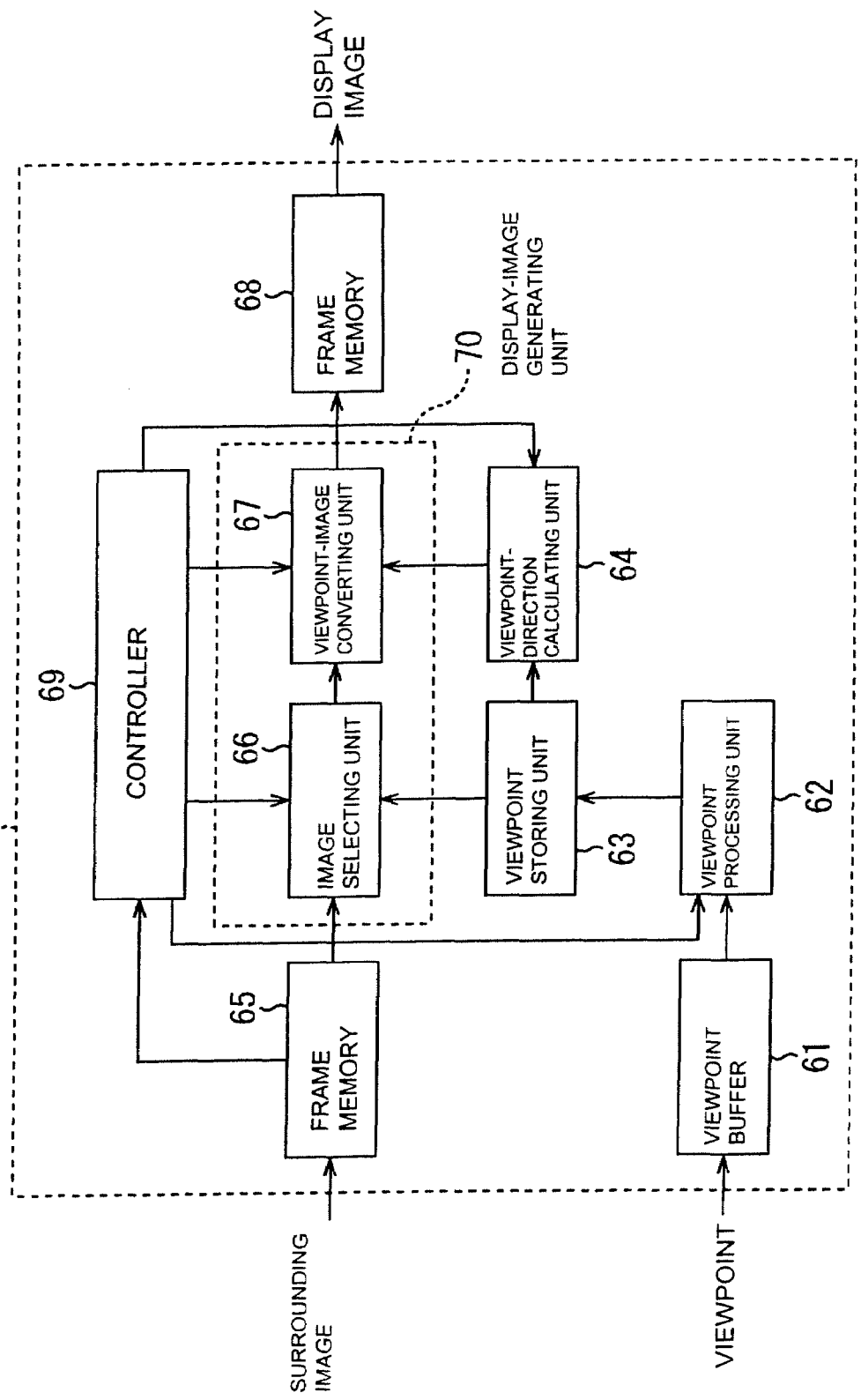
FIG. 23: Block diagram showing an example configuration of a surrounding-image processing unit.

FIG. 23 shows an example configuration of the surrounding-image processing unit 35 shown in FIG. 6, which executes the processing described above (surrounding-image processing). A viewpoint buffer 61 receives a viewpoint of a user, output from the viewpoint detecting unit 37 (FIG. 6). The viewpoint buffer 61 stores the viewpoint supplied from the viewpoint detecting unit 37. If a plurality of users is present, the viewpoint detecting unit 37 shown in FIG. 6 detects viewpoints of the plurality of users, and supplies the viewpoints to the viewpoint buffer 61. In that case, the viewpoint buffer 61 stores all the viewpoints of the plurality of users, supplied from the viewpoint detecting unit 37.

A viewpoint processing unit 62 reads the viewpoint of the user, stored in the viewpoint buffer 61, executes predetermined processing on the viewpoint as required, and supplies the result to a viewpoint storing unit 63. The viewpoint storing unit 63 stores the viewpoint supplied from the viewpoint processing unit 62. A viewpoint-direction calculating unit 64 calculates a direction of the viewpoint stored in the viewpoint storing unit 63 (viewpoint direction), and supplies it to a viewpoint-image converting unit 67.

A frame memory 65 stores, on a frame-by-frame basis, surrounding-image data supplied from the demultiplexer 32 (FIG. 6), and reads the surrounding-image data and supplies it to an image selecting unit 66. The frame memory 65 is constructed similarly to the frame memory 51 shown in FIG. 14, so that the frame memory 65 allows simultaneous storing and reading of surrounding-image data.

The image selecting unit 66 selects image data needed to generate a viewpoint image associated with the viewpoint stored in the viewpoint storing unit 63 from the surrounding-image data supplied from the frame memory 65. More specifically, the surrounding-image data is a set of image data captured by the plurality of surrounding cameras $22_1$, $22_2$, $22_3$, . . . disposed at a plurality of camera positions, as shown in FIG. 4, and letting the image data constituting the surrounding-image data, captured by a surrounding camera $22_k$, be referred to as camera-image data, the image selecting unit 66 selects camera-image data from the surrounding-image data based on the viewpoint stored in the viewpoint storing unit 63.

Then, the image selecting unit 66 supplies the camera-image data selected from the surrounding-image data based on the viewpoint stored in the viewpoint storing unit 63, as it is or after processing it, to the viewpoint-image converting unit 67 as viewpoint-image data associated with the viewpoint.

The viewpoint-image converting unit 67, based on the viewpoint direction supplied from the viewpoint-direction calculating unit 64 and based on the shape of the inner dome screen 44 (FIG. 8), generates display-image data for displaying an image on the display surface of the inner omnidirectional projector 43 (FIG. 8) using the viewpoint image data supplied from the image selecting unit 66, and supplies it to a frame memory 68.

The image selecting unit 66 and the viewpoint-image converting unit 67 described above constitute a display-image generating unit 70 for generating display-image data from surrounding-image data based on the viewpoint of the user and the shape of the inner dome screen 44 (FIG. 8).

The frame memory 68 stores the display-image data supplied from the viewpoint-image converting unit 67, and supplies the display-image data to the inner omnidirectional projector 43 (FIG. 8). The frame memory 68 is constructed similarly to the frame memory 51 shown in FIG. 14, so that the frame memory 68 allows simultaneous storing and reading of display-image data.

A controller 69 controls the viewpoint processing unit 62, the viewpoint-direction calculating unit 64, the image selecting unit 66, and the viewpoint-image converting unit 67 with reference to the status of storage of surrounding-image data in the frame memory 65.

Figure 24:
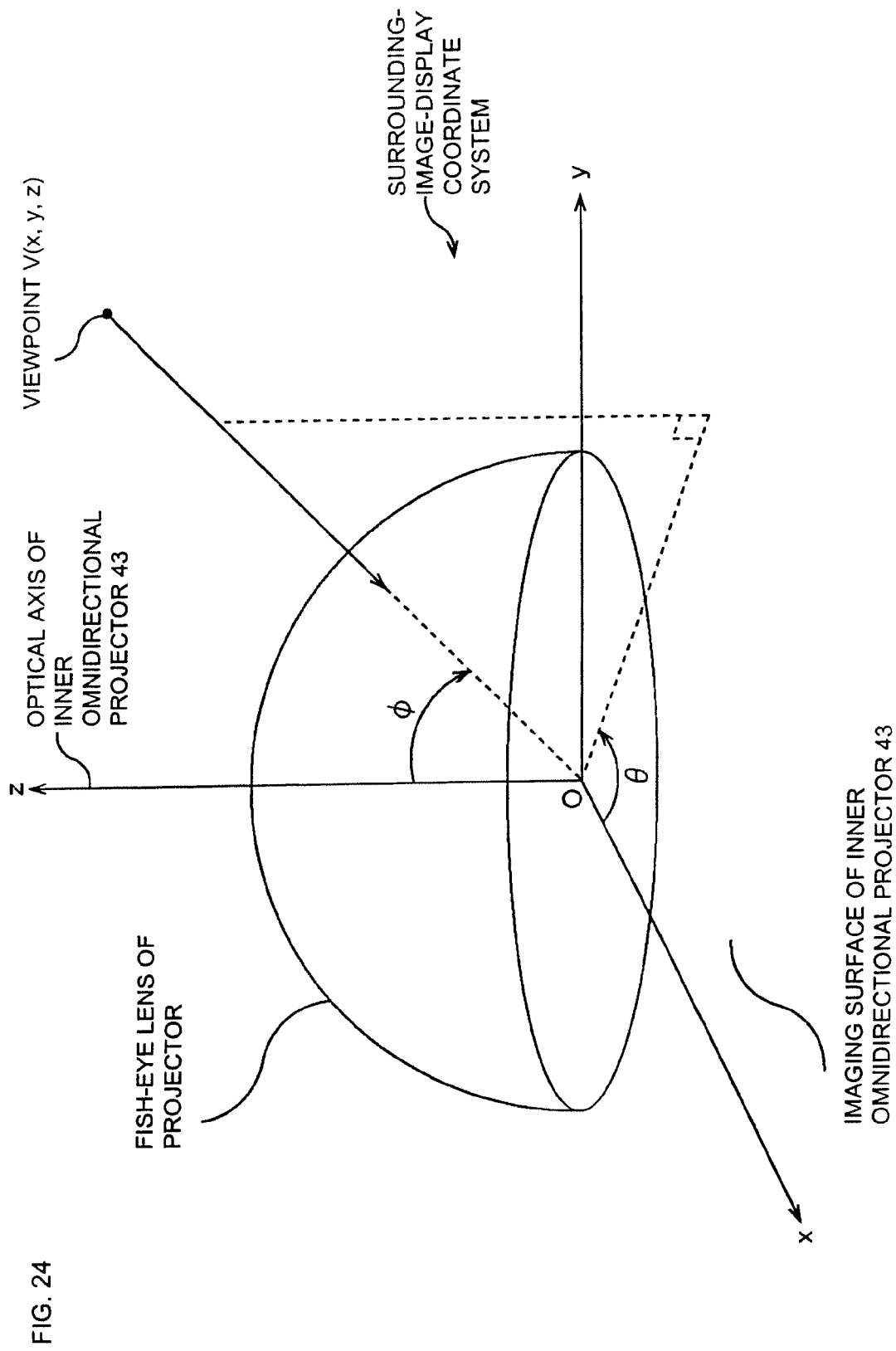
FIG. 24: Diagram for explaining processing that is executed by a viewpoint-direction calculating unit.

Next, processing that is executed by the viewpoint-direction calculating unit 64 shown in FIG. 23 will be described with reference to FIG. 24. The viewpoint-direction calculating unit 64 calculates a longitude and a latitude that represent a direction of the viewpoint stored in the viewpoint storing unit 63 (viewpoint direction).

Now, letting a three-dimensional coordinate system in which the optical axis of the inner omnidirectional projector 43 constitutes a z axis and in which the display surface of the inner omnidirectional projector 43 constitutes an xy plane be referred to as a surrounding-image-display coordinate system, the viewpoint-direction calculating unit 64 calculates, as a viewpoint direction, the direction of a viewpoint V(x, y, z) at a certain position as viewed from the origin O in the surrounding-image-display coordinate system.

Now, with regard to the surrounding-image-display coordinate system, letting an angle with respect to the x axis on the xy plane be referred to as a longitude $\theta$, an angle with respect to the z axis be referred to as a latitude $\phi$, and the direction of a point with a longitude $\theta$ and a latitude $\phi$ be denoted as a direction ($\theta$, $\phi$), the longitude $\theta$ and the latitude $\phi$ representing the viewpoint direction ($\theta$, $\phi$) of the viewpoint V(x, y, z) can be calculated by the following equations, respectively.

$$\theta = \tan^{-1}\frac{y}{x} \quad (6)$$

$$\phi = \frac{\pi}{2} - \tan^{-1}\frac{z}{\sqrt{x^2 + y^2}} \quad (7)$$

The viewpoint-direction calculating unit 64 calculates the viewpoint direction (θ, φ) according to equations (6) and (7), and supplies it to the viewpoint-image converting unit 67.

Next, processing that is executed by the display-image generating unit 70 shown in FIG. 23 will be described with reference to FIGS. 25 to 27.

Figure 25:
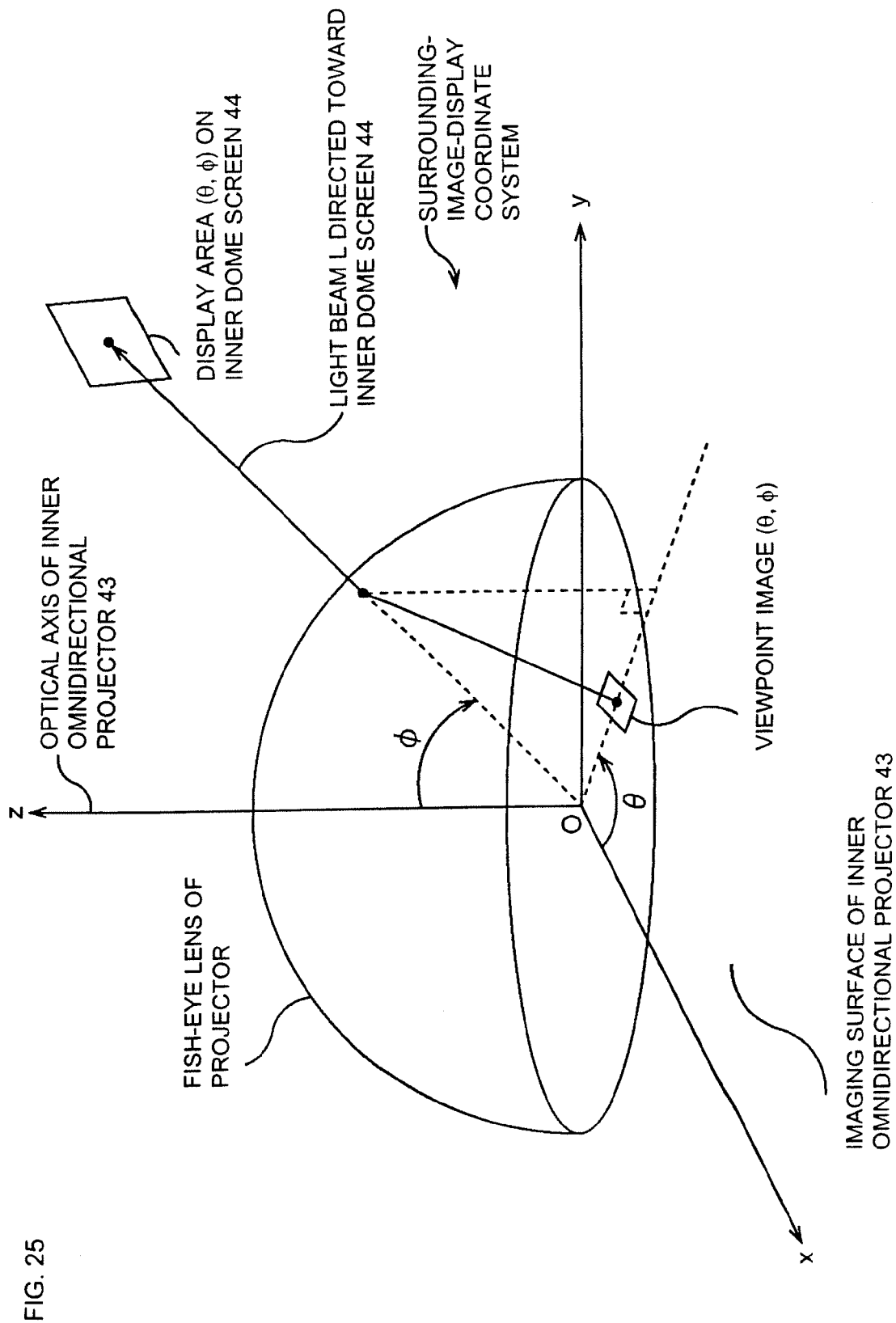
FIG. 25: Diagram for explaining processing that is executed by a display-image generating unit.

In order to present a user with a display on the inner dome screen 44 (FIG. 8) of a viewpoint image of an object as viewed from a viewpoint of the user, simply, for example, as shown in FIG. 25, camera-image data captured from a viewpoint direction (θ, φ) of the user's viewpoint must be displayed as a viewpoint image in a predetermined range on the inner dome screen 44, centered at an intersection U of the viewpoint direction (θ, φ) and the inner dome screen 44.

Now, letting the viewpoint image, i.e., the camera-image data captured from the viewpoint direction (θ, φ), be denoted as a viewpoint image (θ, φ), and the predetermined range on the inner dome screen 44, centered at the intersection U of the viewpoint direction (θ, φ) of the viewpoint of the user and the inner dome screen 44 as a display area (θ, φ, in order to display the viewpoint image (θ, φ) in the display area (θ, φ), the viewpoint image (θ, φ) must be written to a position on a display image to be displayed on the display surface of the inner omnidirectional projector 43 (FIG. 8).

Thus, in the display-image generating unit 70 shown in FIG. 23, the image selecting unit 66 selects the viewpoint image (θ, φ), i.e., the camera-image data captured from the viewpoint direction (θ, φ) of the viewpoint stored in the viewpoint storing unit 63, and the viewpoint-image converting unit 67 maps the viewpoint image (θ, φ) to a display image so that the viewpoint image (θ, φ) can be displayed in the display area (θ, φ).

Figure 26:
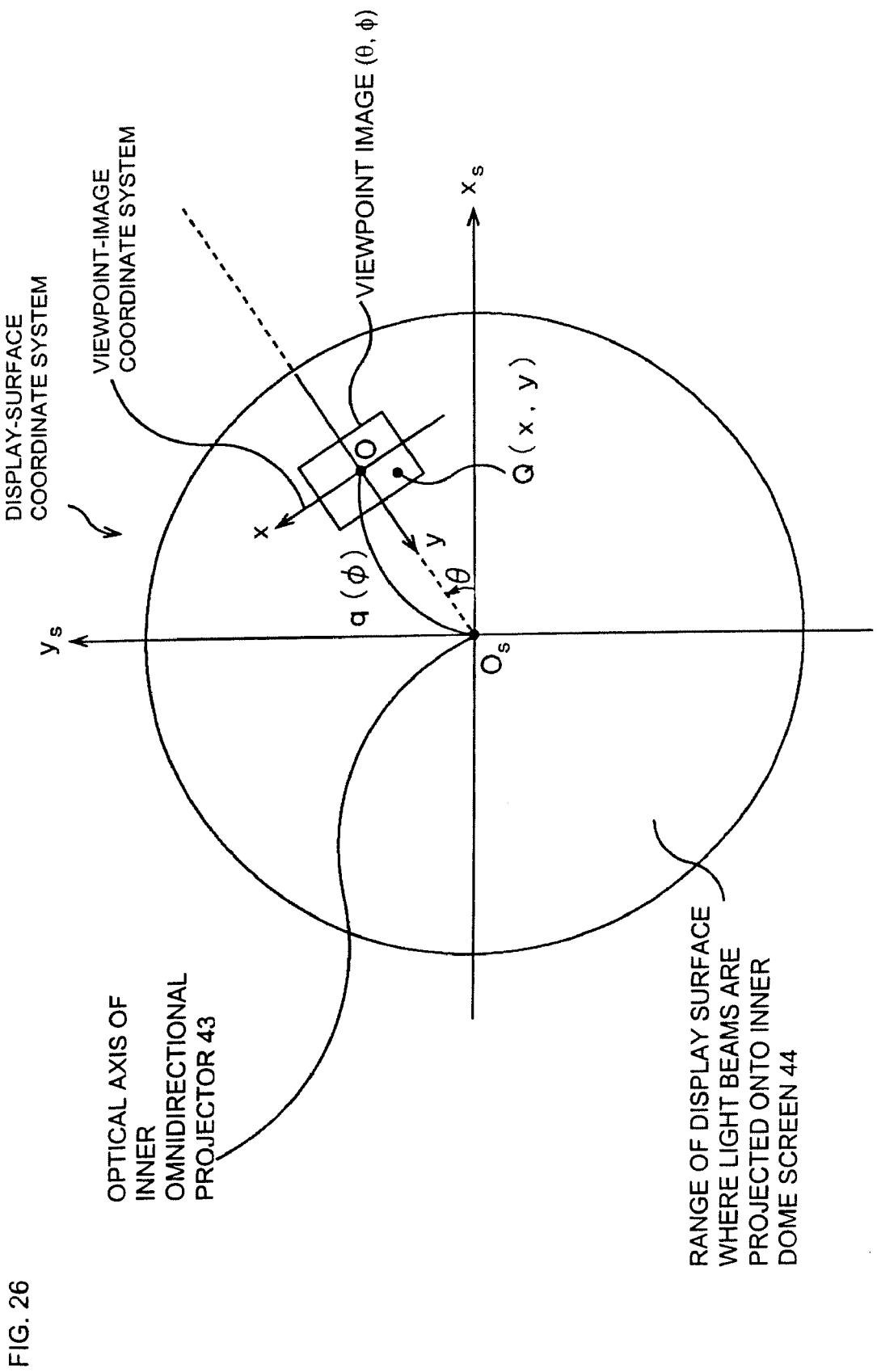
FIG. 26: Diagram for explaining processing that is executed by the display-image generating unit.
Figure 27:
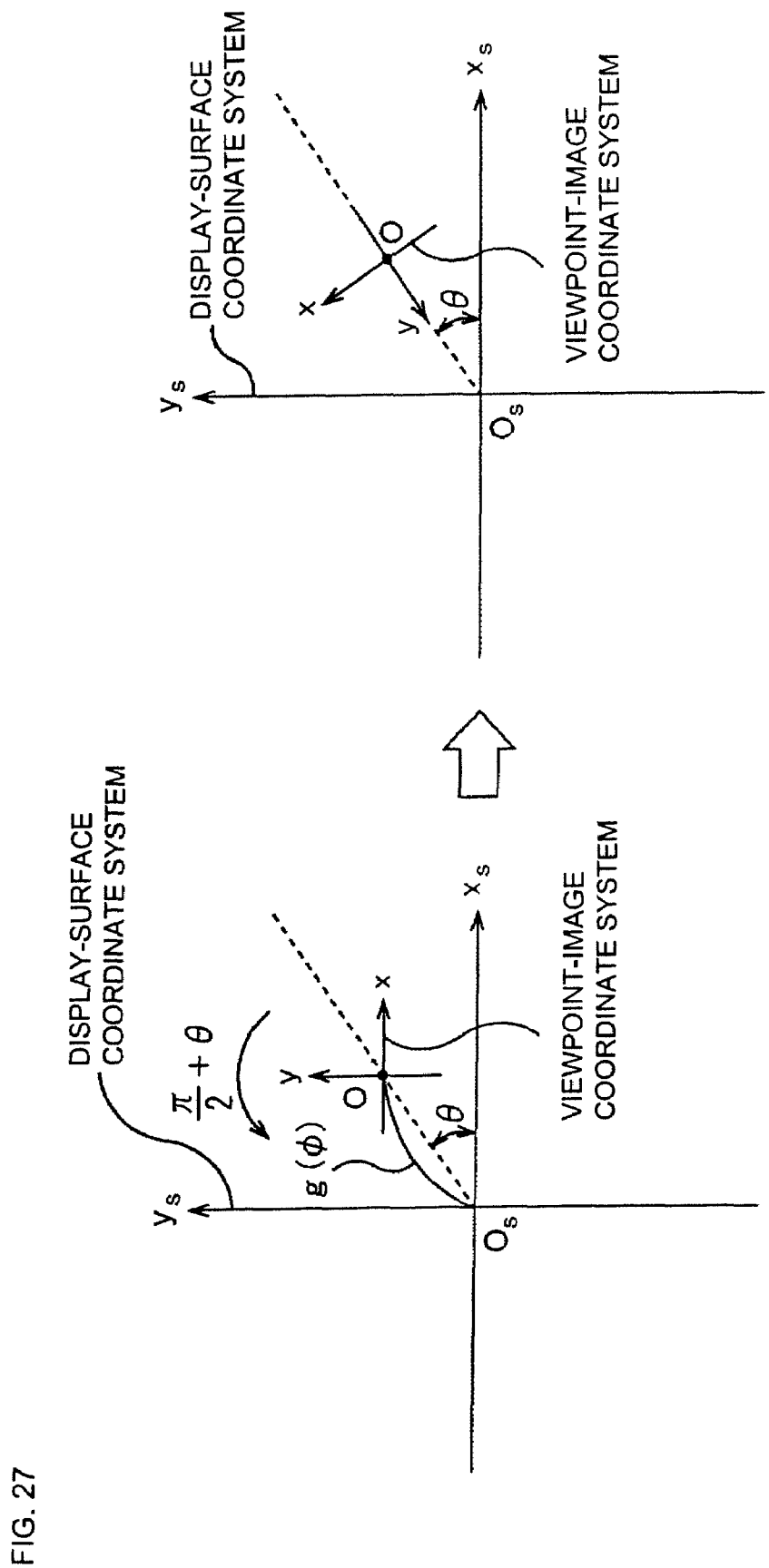
FIG. 27: Diagram for explaining processing that is executed by the display-image generating unit.

Now, let a two-dimensional coordinate system in which the display surface of the inner omnidirectional projector 43 constitutes an xy plane be referred to as a display-surface coordinate system, and an x coordinate and a y coordinate thereof as an $x_a$ coordinate and a $y_a$ coordinate, as shown in FIG. 26. Furthermore, let a two-dimensional coordinate system in which the viewpoint image (θ, φ) constitutes an xy plane be referred to as a viewpoint-image coordinate system. As shown in FIG. 26, the origin $O_a$ of the display-surface coordinate system is taken at an intersection of the optical axis of the inner omnidirectional projector 43 and the display surface, and the origin O of the viewpoint-image coordinate system is taken at a center of the rectangular viewpoint image (θ, φ) (intersection of diagonals of the rectangular viewpoint image (θ, φ)).

In order to display the viewpoint image (θ, φ) in the display area (θ, φ), first, the viewpoint image (θ, φ) must be mapped to a position that is distant from the origin $O_a$ of the display-surface coordinate system by a distance g(φ) corresponding to the latitude φ, as shown in FIG. 26. Furthermore, in order to display the viewpoint image (θ, φ) in the display area (θ, φ), second, the viewpoint image (θ, φ) must be rotated by an angle of (π/2+θ) counterclockwise, as shown in FIG. 27.

Thus, the viewpoint-image converting unit 67 first calculates, according to equation (8), coordinates $(x_{ao}, y_{ao})$ in the display-surface coordinate system of the origin O of the viewpoint-image coordinate system of the viewpoint image (θ, φ).

$$\begin{pmatrix} x_{SO} \\ y_{SO} \end{pmatrix} = \begin{pmatrix} g(\phi)\cos\theta \\ g(\phi)\sin\theta \end{pmatrix} \quad (8)$$

In equation (8), the function g(φ) represents the optical characteristics of the inner omnidirectional projector 43 (FIG. 8) (a function that is determined by a projection method of the fish-eye lens of the inner omnidirectional projector 43).

Furthermore, letting coordinates in the viewpoint-image coordinate system of a pixel Q constituting the viewpoint image (θ, φ) be denoted as $Q(x_Q, y_Q)$, and coordinates thereof in the display-surface coordinate system as $Q(x_{aQ}, y_{aQ})$, the viewpoint-image converting unit 67 calculates, according to equation (9), coordinates $Q(x_{aQ}, y_{aQ})$ in the display-surface coordinate system of the pixel Q constituting the viewpoint image (θ, φ).

$$\begin{pmatrix} x_{SQ} \\ y_{SQ} \end{pmatrix} = \begin{pmatrix} \cos(\frac{\pi}{2}+\theta) & -\sin(\frac{\pi}{2}+\theta) \\ \sin(\frac{\pi}{2}+\theta) & \cos(\frac{\pi}{2}+\theta) \end{pmatrix} \begin{pmatrix} x_Q \\ y_Q \end{pmatrix} + \begin{pmatrix} x_{SO} \\ y_{SO} \end{pmatrix} \quad (9)$$

Then, the viewpoint-image converting unit 67 writes the pixel value of each pixel $Q(x_Q, y_Q)$ constituting the viewpoint image (θ, φ) in the frame memory 68, at a position corresponding to coordinates $(x_{aQ}, y_{aQ})$ expressed by equation (9), thereby converting the viewpoint image (θ, φ) into a display image.

Next, processing that is executed by the surrounding-image processing unit 35 shown in FIG. 23 (surrounding-image processing) will be described with reference to flowcharts shown in FIGS. 28 and 29.

The controller 69 monitors the frame memory 65, and it starts surrounding-image processing when the frame memory 65 starts storing surrounding-image data.

More specifically, in the surrounding-image processing, first in step S21, the controller 69 sets an initial value, for example, 1, in a variable i for counting the number of frames, and the processing then proceeds to step S22.

The process of setting 1 in the variable i in step S21, and a process of incrementing the variable i in step S53, which will be described later, are executed respectively in synchronization with the process of setting 1 in the variable i in step S1 and the process of incrementing the variable i in step S111, described earlier and shown in FIG. 18. That is, the wide-angle-image processing in the wide-angle-image processing unit 33 and the surrounding-image processing in the surrounding-image processing unit 35 are executed in synchronization on the same frame. Thus, the wide-angle-image display unit 34 and the surrounding-image display unit 36 display an immersion image and a bird's-eye image of the same frame in synchronization.

In step S22, the controller 69 sets an initial value, for example, 1, in a variable n for counting the number of users, and the processing then proceeds to step S23. In step S23, the viewpoint processing unit 62 reads the viewpoint of a user #n from the viewpoint buffer 61, and registers it in the viewpoint storing unit 63.

More specifically, the viewpoint detecting unit 37 (FIG. 6) detects viewpoints of all the users present inside the outer dome screen 42 (FIG. 7), for example, at a frame cycle, and updates contents stored in the viewpoint buffer 61 with the latest viewpoints detected. In step S23, the viewpoint processing unit 62 reads the viewpoint of the user #n, stored in the viewpoint buffer 61 at the timing of an i-th frame, and registers it in the viewpoint storing unit 63. The viewpoint of the user #n may be stored in the viewpoint storing unit 63 together with, for example, an ID (identification) representing the user #n.

After the viewpoint processing unit 62 has registered the viewpoint of the user #n in the viewpoint storing unit 63, the processing proceeds to step S24, in which the controller 69 determines whether the variable n equals the total number N of users present inside the outer dome screen 42 (FIG. 7). If it is determined in step S23 that the variable n does not equal N, the processing proceeds to step S25, in which the controller 69 increments the variable n by 1. The processing then returns to step S23, and the same processing is repeated.

On the other hand, if it is determined in step S24 that the variable n equals N, that is, when viewpoints of all the users present inside the outer dome screen 42 (FIG. 7) have been stored in the viewpoint storing unit 63, the processing proceeds to step S26. In step S26, the controller 69 sets, as an initial value, the total number N of users present inside the outer dome screen 42 (FIG. 7) in a variable M representing the total number of viewpoints to be processed in the viewpoint selecting unit 66. The processing then proceeds to step S27.

In step S27, the controller 69 sets an initial value, for example, 1, in a variable m for counting the number of viewpoints, and sets an initial value in a flag indicating the presence or absence of short-range viewpoints, for example, 0 indicating the absence of short-range viewpoints, which will be described later. The processing then proceeds to step S28.

In step S28, the viewpoint processing unit 62, with regard to an m-th viewpoint among the M viewpoints stored in the viewpoint storing unit 63, calculates distances from the other (M−1) respective viewpoints (viewpoint distances), and detects viewpoints with viewpoint distances not greater than (or distances smaller than) a predetermined threshold value TH1 as short-range viewpoints for the m-th viewpoint. The processing then proceeds to step S29, in which the viewpoint processing unit 62 determines whether a short-range viewpoint exists for the m-th viewpoint.

If it is determined in step S29 that a short-range viewpoint does not exist for the m-th viewpoint, that is, if a viewpoint with a viewpoint distance from the m-th viewpoint not greater than the threshold value TH1 is not stored (registered) in the viewpoint storing unit 63, steps S30 to S34 are skipped and the processing proceeds to step S35.

On the other hand, if it is determined in step S29 that a short-range viewpoint exists for the m-th viewpoint, that is, if a viewpoint with a viewpoint distance from the m-th viewpoint not greater than the threshold value TH1 (short-range viewpoint) is stored (registered) in the viewpoint storing unit 63, the processing proceeds to step S30. In step S30, the controller 69 sets, for example, 1 in the flag, indicating the presence of a short-range viewpoints, and the processing then proceeds to step S31.

The process in step S30 can be skipped if 1 is already set in the flag.

In step S31, the viewpoint processing unit 62 detects the number of viewpoints determined as short-range viewpoints for the m-th viewpoint among the viewpoints stored in the viewpoint storing unit 63, and further detects a barycenter (a center of mass between two associated objects) of the short-range viewpoints and the m-th viewpoint.

Then, the processing proceeds to step S32, in which the viewpoint processing unit 62 registers (writes) the barycenter calculated in step S31 as the m-th viewpoint in the viewpoint storing unit 63 by overwriting, and the processing then proceeds to step S33. In step S33, the viewpoint processing unit 62 deletes the viewpoints determined as short-range viewpoints for the m-th viewpoint among the viewpoints stored in the viewpoint storing unit 63, and the processing then proceeds to step S34.

In step S34, the controller 69 subtracts the number of short-range viewpoints detected in step S31 from the variable M representing the total number M of viewpoints to be processed in the viewpoint selecting unit 66, and newly sets the resulting value of subtraction to the variable M, and the processing then proceeds to step S35. That is, since the short-range viewpoints among the viewpoints stored in the viewpoint storing unit 63 are deleted in step S33, the value of the variable M is decreased in step S34 by the number of short-range viewpoints deleted.

Figure 28:
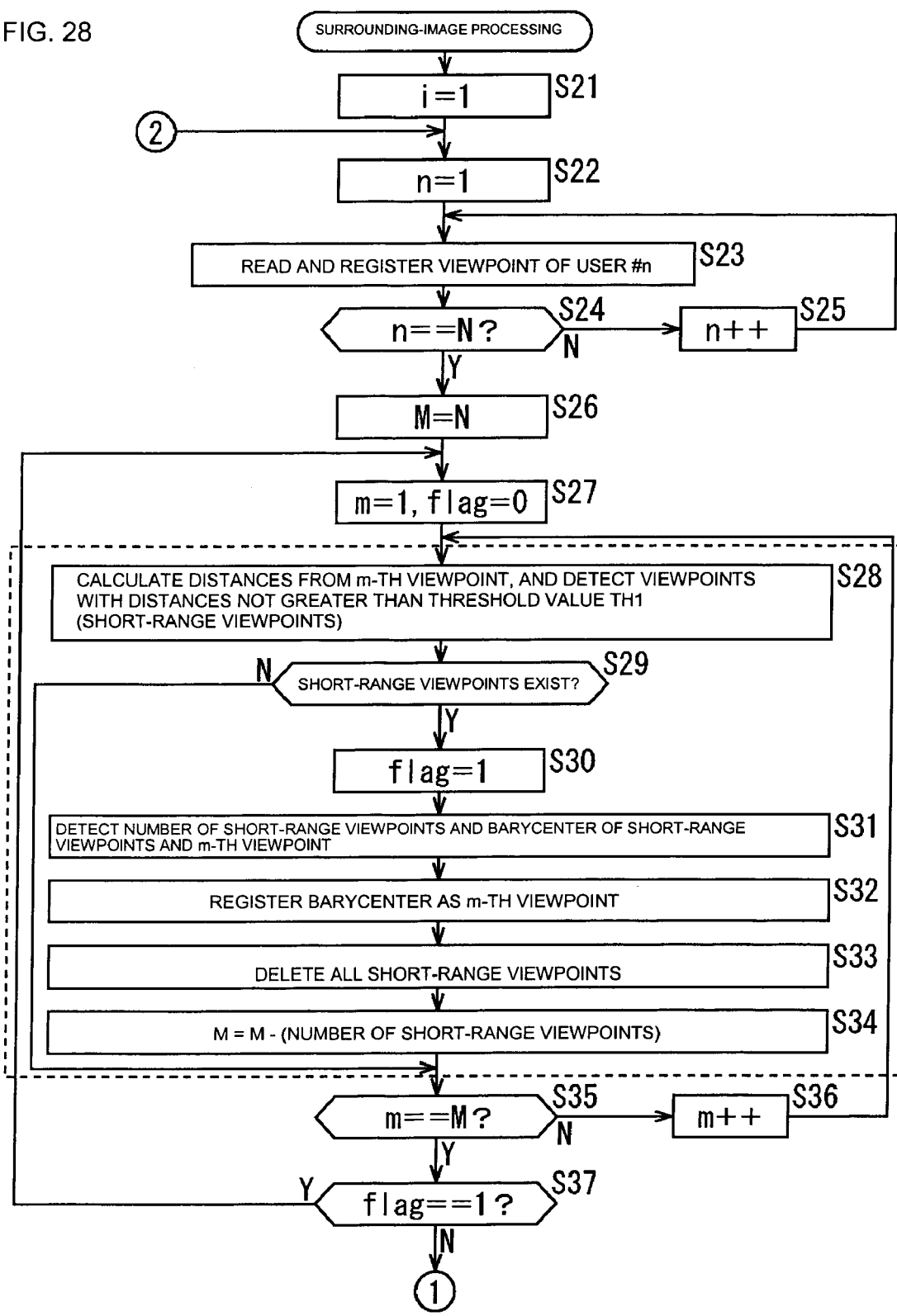
FIG. 28: Flowchart for explaining surrounding-image processing.

Thus, by the processing from step S28 to step S34, enclosed by a dotted line in FIG. 28, one or more viewpoints that are close in distance to the m-th viewpoint are detected, and the one or more viewpoints and the m-th viewpoint are integrated into a position at the barycenter of these viewpoints.

In step S35, the controller 69 determines whether the variable m equals the variable M, i.e., the number of viewpoints M stored in the viewpoint storing unit 63. If it is determined in step S35 that the variable m does not equal the variable M, the processing proceeds to step S36, in which the controller 69 increments the variable m by 1. The processing then returns to step S28, and the same processing is repeated.

On the other hand, if it is determined in step S35 that the variable m equals the variable M, the processing proceeds to step S37, in which the controller 69 determines whether the flag equals 1. If it is determined in step S37 that the flag equals 1, that is, if a viewpoint having been integrated in the previous loop processing from step S28 to step S36 exists among the viewpoints stored in the viewpoint storing unit 63 and if viewpoints could be further integrated, the processing returns to step S27, and the same processing is repeated.

Figure 29:
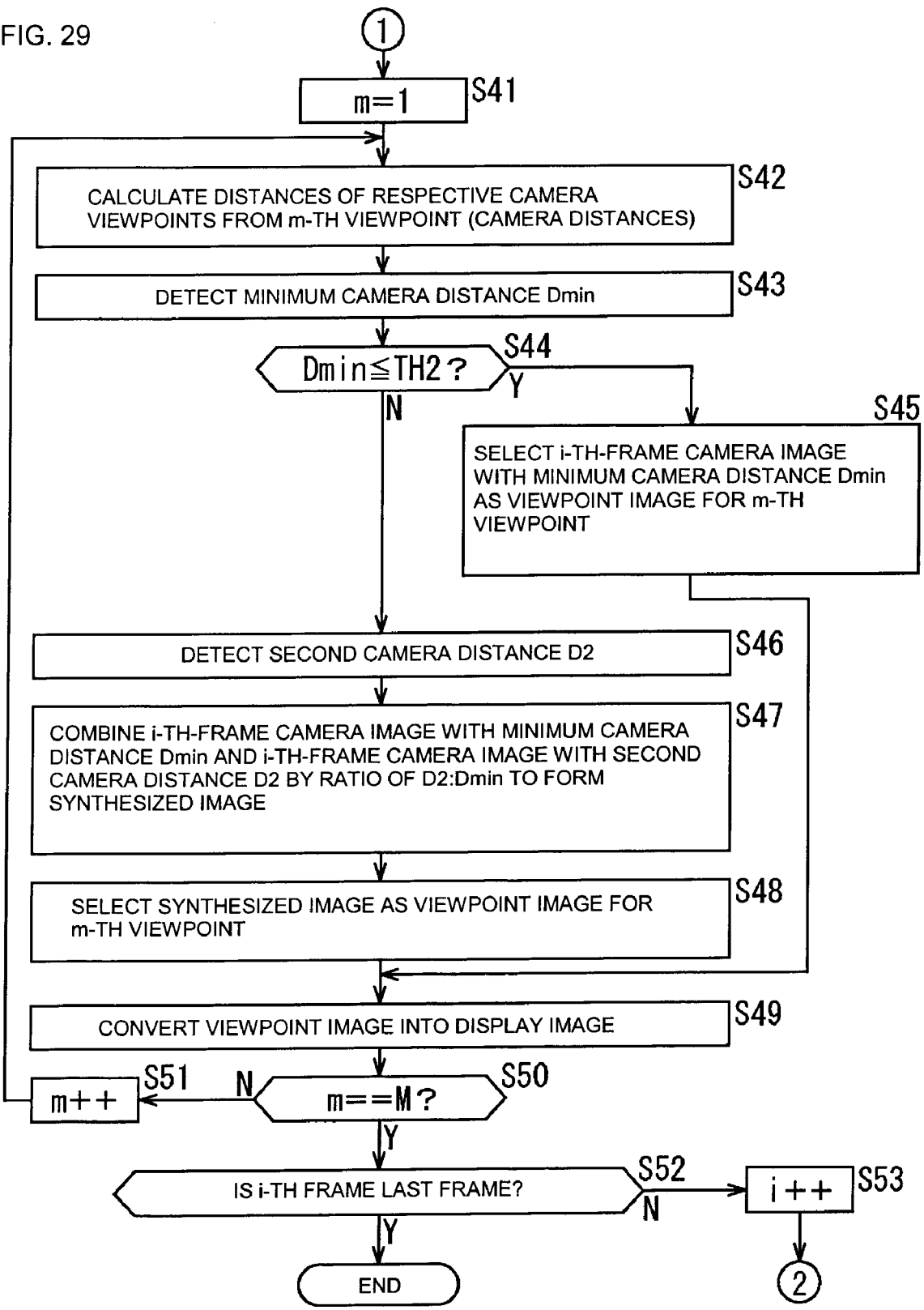
FIG. 29: Flowchart for explaining the surrounding-image processing.

On the other hand, if it is determined in step S37 that the flag does not equal 1, that is, if the flag remains 0 as set in step S27 and if a viewpoint with a distance from other viewpoints not greater than the threshold value TH1 does not exist among the viewpoints stored in the viewpoint storing unit 63, the processing proceeds to step S41 shown in FIG. 29.

In step S41, the controller 69 sets an initial value, for example, 1, to the variable m for counting the number of viewpoints, and the processing proceeds to step S42. In step S42, the image selecting unit 66 calculates, as camera distances, distances between the m-th viewpoint stored in the viewpoint storing unit 66 and the camera viewpoints of the surrounding cameras $22_k$ constituting the surrounding imaging unit 12.

The camera viewpoints of the surrounding cameras $22_k$ refer to camera positions that are multiplexed with surrounding-image data, normalized (divided) by a predetermined normalization factor β. The normalization factor β may be, for example, a value obtained by dividing a distance from the origin to a most remote viewpoint that a user can take in the surrounding-image-display coordinate system by a distance from an object to a surrounding camera $22_k$ that is farthest from the object.

After the process of step S42, the processing proceeds to step S43, in which the image selecting unit 66 calculates, as a minimum camera distance, a minimum value $D_{min}$ among the camera distances calculated for the m-th viewpoint in step S42, and the processing proceeds to step S44. In step S44, the image selecting unit 66 determines whether the minimum camera distance $D_{min}$ for the m-th viewpoint is not greater than (or is smaller than) a predetermined threshold value TH2.

If it is determined in step S44 that the minimum camera distance $D_{min}$ for the m-th viewpoint is not greater than the predetermined threshold value TH2, that is, if the camera viewpoint with the minimum camera distance $D_{min}$ is close to the m-th viewpoint and can therefore be considered as the m-th viewpoint, the processing proceeds to step S45. In step S45, the image selecting unit 66 selects, as a viewpoint image for the m-th viewpoint, an i-th frame camera image captured by a surrounding camera $22_k$ having a camera viewpoint with the minimum camera distance $D_{min}$, from among the surrounding image data stored in the frame memory 65, and supplies it to the viewpoint-image converting unit 67. The processing then proceeds to step S49.

On the other hand, if it is determined in step S44 that the minimum camera distance $D_{min}$ for the m-th viewpoint is greater than the predetermined threshold value TH2, that is, if the camera viewpoint with the minimum camera distance $D_{min}$ is not close to the m-th viewpoint and therefore cannot be considered as the m-th viewpoint, the processing proceeds to step S47. In step S47, the image selecting unit 66 detects, as a second camera distance $D_2$, the second smallest camera distance calculated for the m-th viewpoint, and selects two camera images from among the surrounding-image data stored in the frame memory 65, namely, an i-th frame camera image captured by a surrounding camera $22_k$ having a camera viewpoint with the minimum camera distance $D_{min}$ and an i-th frame camera image captured by a surrounding camera $22_k$ having a camera viewpoint with the second camera distance $D_2$. Furthermore, in step S47, the image selecting unit 66 combines the i-th frame camera image captured by the surrounding camera $22_k$ having the camera viewpoint with the minimum camera distance $D_{min}$ and the i-th frame camera image captured by the surrounding camera $22_k$ having the camera viewpoint with the second camera distance $D_2$ by a ratio $D_2:D_{min}$ of the second camera distance $D_2$ and the minimum camera distance $D_{min}$, thereby generating a synthesized image.

That is, letting a c-th pixel constituting the i-th frame camera image captured by the surrounding camera $22_k$ having the camera viewpoint with the minimum camera distance $D_{min}$ be denoted as $p_c$, and a c-th pixel constituting the i-th frame camera image captured by the surrounding camera $22_k$ having the camera viewpoint with the second camera distance $D_2$ be denoted as $q_c$, the image selecting unit 66 generates a synthesized pixel by combining the pixels $p_c$ and $q_c$ according to a formula $(D_2 \times p_c + D_{min} \times q_c)/(D_2 + D_{min})$, and generates a synthesized image composed of such synthesized pixels.

Although a synthesized image is generated using two camera images in the example given above, alternatively, a synthesized image may be generated using three or more camera images.

The processing then proceeds to step S48, in which the image selecting unit 66 selects the synthesized image generated in step S47 as a viewpoint image for the m-th viewpoint, and supplies it to the viewpoint-image converting unit 67. The processing then proceeds to step S49.

In step S49, the viewpoint image for the m-th viewpoint is converted into a display image. More specifically, in step S49, the viewpoint-direction calculating unit 64 calculates a viewpoint direction ($\theta$, $\phi$) of the m-th viewpoint stored in the viewpoint storing unit 63, and supplies it to the viewpoint-image converting unit 67. The viewpoint-image converting unit 67, based on the viewpoint direction ($\theta$, $\phi$) of the m-th viewpoint, supplied from the viewpoint-direction calculating unit 64, calculates a position of a display image where each pixel of the viewpoint image for the m-th viewpoint, supplied from the image selecting unit 66, is to be mapped, according to equations (8) and (9). Then, the viewpoint-image converting unit 67 maps (writes) each pixel of the viewpoint image for the m-th viewpoint to a position (address) on the frame memory 68 corresponding to the position of the display image thus calculated. The processing then proceeds to step S50.

Then, light beams corresponding to the display image written to the frame memory 68 are emitted from the inner omnidirectional projector 43, whereby the inner dome screen 44 displays an image of the object as viewed from the m-th viewpoint.

In step S50, the controller 69 determines whether the variable m equals the total number M of the viewpoints stored in the viewpoint storing unit 63. If it is determined in step S50 that the variable m does not equal M, the processing proceeds to step S51, in which the controller 69 increments the variable m by 1. The processing then returns to step S42, and the same processing is repeated.

On the other hand, if it is determined in step S50 that the variable m equals M, that is, if viewpoint images for all the viewpoints stored in the viewpoint storing unit 63 have been converted into display images and the display images have been written to the frame memory 68, the inner omnidirectional projector 43 (FIG. 8) emits light beams corresponding to the display images stored in the frame memory 68 as images of the i-th frame. Accordingly, the inner dome screen 44 displays bird's-eye images of the objects as viewed respectively from the first to M-th viewpoints at positions in accordance with the respective viewpoints.

Then, the processing proceeds to step S52, in which the controller 69 refers to the frame memory 65 to determine whether the i-th frame is the last frame. If it is determined in step S52 that the i-th frame is not the last frame, that is, if surrounding-image data of a frame subsequent to the i-th frame is stored in the frame memory 65, the processing proceeds to step S53. In step S53, the controller 69 increments the variable i by 1. The processing then returns to step S22 shown in FIG. 28, and the same processing is repeated.

On the other hand, if it is determined in step S52 that the i-th frame is the last frame, that is, if surrounding-image data of a frame subsequent to the i-th frame is not stored in the frame memory 65, the surrounding-image processing is exited.

As described above, in the display system 2, an immersion image of the i-th frame is displayed on the inner surface of the outer dome screen 42, and a bird's-eye image of the i-th frame is displayed on the outer surface of the inner dome screen 44. Accordingly, the user is allowed to experience a sense of immersion provided by the immersion image, and is also allowed to readily grasp his/her own position by the bird's-eye image.

Thus, for example, if the imaging/display system shown in FIG. 1 is used for imaging and display of a sports program, a large number of surrounding cameras $22_k$ (FIG. 4) of the imaging system 1 is disposed successively so as to surround a stadium where the sports event is being held, and the omnidirectional camera 21 (FIG. 3) is disposed at a center of the stadium so as to allow imaging. Accordingly, the display system is allowed to display an image that provides a sense of presence.

Furthermore, the inner dome screen 44 displays a bird's-eye image in accordance with a viewpoint of a user at a position in accordance with the viewpoint of the user, so that the bird's-eye image presented to the user changes as the user moves his/her viewpoint. Thus, the user is allowed to "look into" an object, that is, moves his/her viewpoint to view an object that has been hidden as viewed from a certain viewpoint. Furthermore, bird's-eye images of an object as viewed from respective viewpoints of a plurality of users can be presented to the plurality of users.

Furthermore, with the display system 2, for example, the outer dome screen 42 (FIG. 7) displays fish, animals, etc. that are remote while the inner dome screen 44 (FIG. 8) displays fish, animals, etc. that are nearby, thereby virtually implementing a nature observing facility such as an aquarium or zoo.

Furthermore, the display system 2 allows display of an artificially produced image such as computer graphics instead of an image actually captured. That is, the display system 2 allows display of a computer graphic image of the cosmic space, microscopic structure of molecules, etc. In that case, an interface that allows a user to intuitively grasp a structure that cannot usually be recognized by the vision is provided.

Furthermore, the display system 2 can be used, for example, for displaying images in what is called a video game.

The series of processing steps by the wide-angle-image processing unit 33 and the surrounding-image processing unit 35 shown in FIG. 6 may be executed either by hardware or by software. When the series of processing steps is executed by software, programs constituting the software are installed, for example, on a general-purpose computer.

Figure 30:
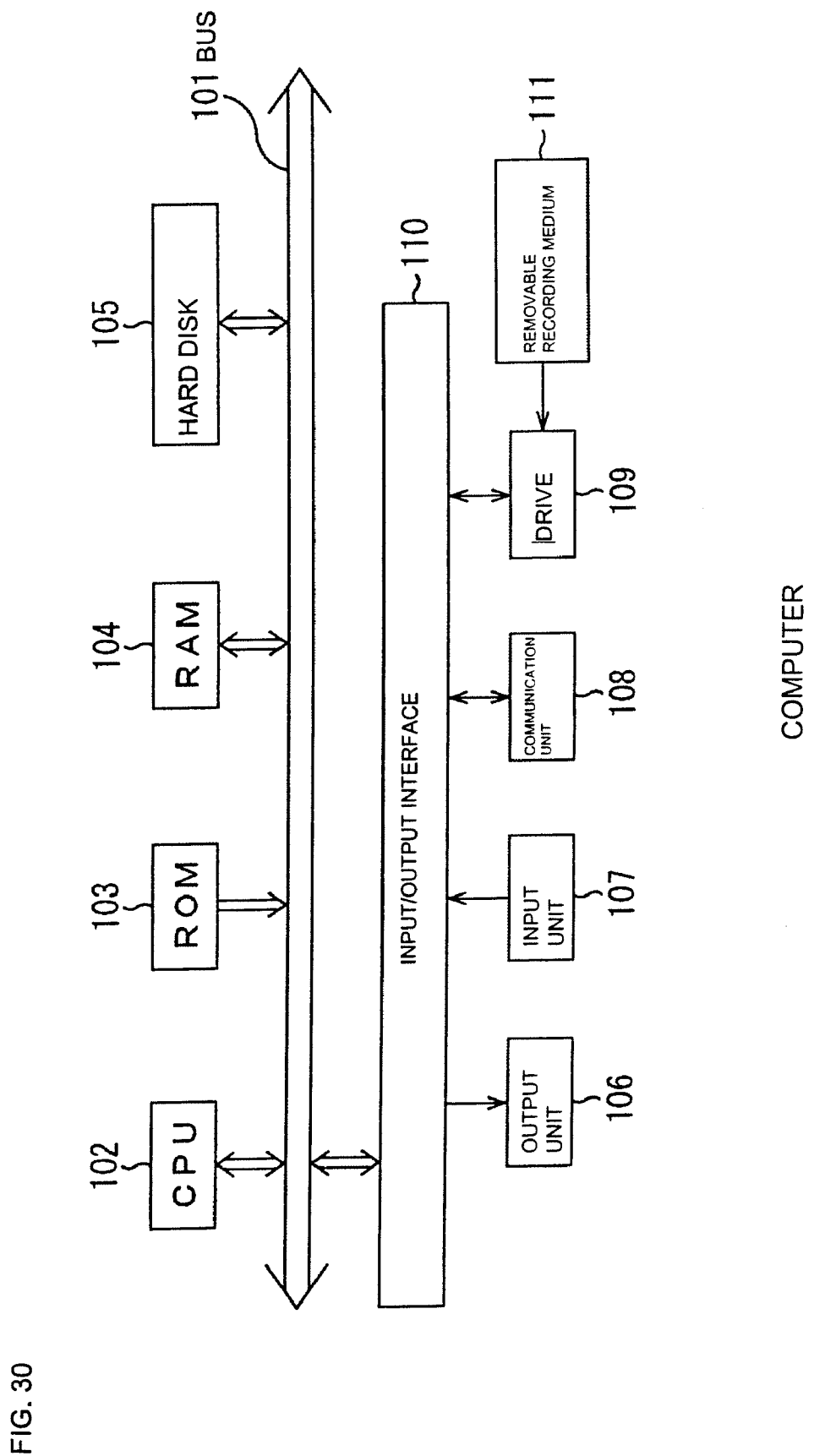
FIG. 30: Block diagram showing an example configuration of a computer according to an embodiment of the present invention.

FIG. 30 shows an example configuration of a computer on which the programs for executing the series of processing steps described above are to be installed, according to an embodiment.

The programs can be stored in advance in a hard disc 105 or a ROM 103, which is a recording medium included in the computer.

Alternatively, the programs may be temporarily or permanently stored (recorded) on a removable recording medium 111 such as a flexible disc, a CD-ROM (compact disc read only memory), an MO (magneto optical) disc, a DVD (digital versatile disc), a magnetic disc, or a semiconductor memory. The removable recording medium 111 can be provided as so-called package software.

Instead of installing the programs onto the computer from the recording medium 111 as described above, the programs may be transferred by wireless from a downloading site to the computer via an artificial satellite for digital satellite broadcasting, or transferred through wires via networks such as a LAN (local area network) and the Internet so that the programs transferred to the computer will be received by a communication unit 108 and can be installed onto the internal hard disc 105.

The computer includes a CPU (central processing unit) 102. The CPU 102 is connected to an input/output interface 110 via a bus 101. When the CPU 102 receives input of a command issued by a user by operating an input unit 107 including, for example, a keyboard, a mouse, and a microphone, the CPU 102 executes a program stored in the ROM (read only memory) 103 according to the command. Alternatively, the CPU 102 loads into a RAM (random access memory) and executes a program stored in the hard disc 105, a program transferred via a satellite or a network, received by the communication unit 108, and installed on the hard disc 105, or a program read from the removable recording medium 111 and installed on the hard disc 105. The CPU 102 thus executes the above-described processing according to the flowcharts or processing executed with the above-described arrangements shown in the block diagrams. The CPU 102 then outputs the processing result from an output unit 106 including, for example, an LCD (liquid crystal display) and a speaker, sends it from the communication unit 108, or records it on the hard disc 105 as required, for example, via the input/output interface 110.

The processing steps defining the programs for allowing the computer to execute the various processes in this specification need not necessarily be executed sequentially in the time order shown in the flowcharts, and may be executed in parallel or individually (e.g., parallel processing or processing using objects).

Furthermore, the programs may be executed either by a single computer or by distributed processing with a plurality of computers. Furthermore, the programs may be transferred to and executed by a remote computer.

In the display system 2, an image recorded on the recording medium 3 (FIG. 1) can be displayed in an off-line manner, and also, an image transmitted via the transmission medium 4 can be displayed in real time.

Furthermore, as described earlier, the inner omnidirectional projector 43 (FIG. 8) emits light beams corresponding to a display image, and the light beams are back-projected onto the inner dome screen 44 (FIG. 8); thus, when a viewpoint image is displayed, the left and right of the viewpoint image is reversed. In order to avoid the left-right reversal of the viewpoint image displayed on the inner dome screen 44, for example, the left and right of a camera image that serves as an original for the viewpoint image must be reversed in advance. This reversal can be executed, for example, by the image selecting unit 66 (FIG. 23) of the surrounding-image processing unit 35. Alternatively, the left-right reversal of the camera image may be executed optically when the camera image is captured by a surrounding camera $22_k$ (FIG. 4) of the imaging system 1.

Furthermore, in this embodiment, the inner omnidirectional projector 43 (FIG. 8) emits light beams corresponding to a display image, and the light beams are back-projected to the inner dome screen 44 (FIG. 8), whereby a viewpoint image is displayed. In this case, the viewpoint image must be generated with consideration of the shape of the inner dome screen 44 (FIG. 8). More specifically, considering that the viewpoint image is rectangular, when the rectangular viewpoint image is mapped to a particular position of the display image, light beams corresponding to the display image are emitted by the inner omnidirectional projector 43, whereby the viewpoint image is displayed on the inner dome screen 44, since the rectangular viewpoint image is projected onto the spherical surface of the inner dome screen 44 having a shape of a hemisphere, the viewpoint image displayed on the inner dome screen 44 is distorted. Thus, in order that the inner dome screen 44 display the viewpoint image in a rectangular shape without distortion, the viewpoint-image converting unit 67 (FIG. 23) must convert the viewpoint image and map it to a display image based on the shape of the inner dome screen 44.

In this embodiment, however, the radius of the inner dome screen 44 (FIG. 8) is large to a certain extent, and the range where the viewpoint image is displayed can be considered as planar. In this case, the conversion and mapping of the viewpoint image to a display image based on the shape of the inner dome screen 44 is optional.

Furthermore, although only one surrounding imaging unit 12 (FIG. 2) is disposed in the imaging system 1 in this embodiment, a plurality of surrounding imaging units may be provided. In that case, the arrangement may be such that the plurality of surrounding imaging units captures images of a plurality of objects that are spatially or temporally separated, and that the display system 2 processes an image obtained by superimposing the images of the plurality of objects as a camera image.

Furthermore, the wide-angle-image processing unit 33, the surrounding-image processing unit 35, and the viewpoint detecting unit 37 shown in FIG. 6 may be provided in the imaging system 1 (FIG. 2) instead of the display system 1.

The present patent specification contains subject matter related to that disclosed in Japanese priority document, application number P2002-291819, filed in the Japanese patent office on Oct. 4, 2002, the entire contents of which being incorporated herein by reference.

For convenience, the following reference numerals are used throughout the figures to represent the various components employed in one or more embodiments according to the present invention. 1: imaging system; 2: display system; 3: recording medium; 4: transmission medium; 11: wide-angle imaging unit; 12: surrounding imaging unit; 13: multiplexer; 14: recording/sending unit; 21: omnidirectional camera; 22$_k$: surrounding cameras; 31: playback/receiving unit; 32: demultiplexer; 33: wide-angle-image processing unit; 34: wide-angle-image display unit; 35: surrounding-image processing unit; 36: surrounding-image display unit; 37: viewpoint detecting unit; 41: outer omnidirectional projector; 42: outer dome screen; 43: inner omnidirectional projector; 44: inner dome screen; 51: frame memory; 52: wide-angle-image converting unit; 53: image-angle correcting unit; 54: latitude-longitude-image converting unit; 55: frame memory; 56: controller; 61: viewpoint buffer; 62: viewpoint processing unit; 63: viewpoint storing unit; 64: viewpoint-direction calculating unit; 65: frame memory; 66: image selecting unit; 67: viewpoint-image converting unit; 68: frame memory; 69: controller; 70: display-image generating unit; 101: bus; 102: CPU; 103: ROM; 104: RAM; 105: hard disc; 106: output unit; 107: input unit; 108: communication unit; 109: drive; 110: input/output interface; 111: removable recording medium

We claim:

1. A display apparatus, comprising:
    a first display structure having a 3-dimensional shape with an interior surface, said first display structure being configured to display a first image on said interior surface so as to be viewable from a position that is at least partially surrounded by said interior surface;
    a second display structure configured to display a second image on another surface that is viewable from said position that is at least partially surrounded by said interior surface; and
    a projector configured to project the second image from within an interior space that is defined by an inside of the second display structure toward the another surface,
    wherein said second image is of an object, and
    wherein the projector is configured to project said second image to the another surface for viewing from a predetermined viewpoint based on the predetermined viewpoint and a shape of the another surface on which the second image is displayed, and to generate the second image using images captured respectively by a plurality of imaging devices that capture respective images of the object.

2. A display apparatus according to claim 1, further comprising the plurality of imaging devices.

3. A display apparatus according to claim 1, wherein the projector comprises:
    an image selecting mechanism configured to select a viewpoint image of the predetermined object as viewed from the predetermined viewpoint, based on the predetermined viewpoint, from the images captured by the plurality of imaging devices; and
    a viewpoint-image converting mechanism configured to convert the viewpoint image into the second image based on the predetermined viewpoint and a shape of the another surface on which the second image is displayed.

4. A display apparatus according to claim 3,
    wherein the image selecting mechanism is configured to select viewpoint images respectively associated with a plurality of viewpoints of the user,
    the viewpoint-image converting mechanism is configured to convert the viewpoint images respectively associated with the plurality of viewpoints of the user so as to generate the second image,
    and wherein the second display structure is configured to display the second image as a compilation of images of the predetermined object as viewed respectively from the plurality of viewpoints.

5. A display apparatus according to claim 3, further comprising:
    an integrating mechanism configured to integrate a plurality of viewpoints of the user into an integrated single viewpoint,
    wherein the image selecting mechanism selects viewpoint images respectively associated with the plurality of viewpoints of the user from images respectively captured by the plurality of imaging devices, and generates the viewpoint image for the integrated single viewpoint from the viewpoint images,
    and wherein the viewpoint-image converting mechanism converts the viewpoint image for the integrated single viewpoint into the second image.

6. A display apparatus according to claim 5,
    wherein the image selecting mechanism is configured to calculate a weighted sum of the viewpoint images respectively associated with the plurality viewpoints of the user in accordance with distances of the respective viewpoints of the user from the integrated single viewpoint so as to generate the viewpoint image for the integrated single viewpoint.

7. A display apparatus according to claim 5,
    wherein the integrating mechanism is configured to integrate the plurality of viewpoints of the user into a position of a barycenter of the plurality of viewpoints of the user.

8. A display apparatus according to claim 5, further comprising a viewpoint-distance calculating mechanism configured to calculate distances among the plurality of viewpoints of the user,
    wherein the integrating mechanism is configured to integrate a plurality of viewpoints of the user having viewpoint distances not greater than a predetermined distance from a single viewpoint.

* * * * *